US011822702B2

(12) United States Patent
Hadar et al.

(10) Patent No.: US 11,822,702 B2
(45) Date of Patent: Nov. 21, 2023

(54) GENERATING ATTACK GRAPHS IN AGILE SECURITY PLATFORMS

(71) Applicant: Accenture Global Solutions Limited, Dublin (IE)

(72) Inventors: Eitan Hadar, Nesher (IL); Amin Hassanzadeh, Arlington, VA (US); Dani Grabois, Tel Aviv-Jaffa (IL); Gil Fidel, Petah Tikva (IL); Avraham Dayan, Bnei Brak (IL)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 17/688,378

(22) Filed: Mar. 7, 2022

(65) Prior Publication Data

US 2022/0188460 A1 Jun. 16, 2022

Related U.S. Application Data

(63) Continuation of application No. 16/554,856, filed on Aug. 29, 2019, now Pat. No. 11,281,806.

(Continued)

(51) Int. Cl.
*G06F 21/70* (2013.01)
*H04L 9/40* (2022.01)
(Continued)

(52) U.S. Cl.
CPC .......... *G06F 21/70* (2013.01); *G06F 16/9024* (2019.01); *G06F 21/577* (2013.01);
(Continued)

(58) Field of Classification Search
CPC .... G06F 21/70; G06F 21/577; G06F 16/9024; G06F 2221/034; H04L 41/14;
(Continued)

(56) References Cited

U.S. PATENT DOCUMENTS

| 5,521,910 A | 5/1996 | Matthews |
| 6,279,113 B1 | 8/2001 | Vaidya |

(Continued)

FOREIGN PATENT DOCUMENTS

| EP | 1559008 | 8/2005 |
| EP | 1768043 | 3/2007 |

(Continued)

OTHER PUBLICATIONS

EP Extended Search Report in European Appln. No. 22193272.6, dated Jan. 25, 2023, 8 pages.

(Continued)

*Primary Examiner* — Sarah Su
(74) *Attorney, Agent, or Firm* — Fish & Richardson P.C.

(57) ABSTRACT

Implementations of the present disclosure include providing, by a security platform, graph data defining a graph that is representative of an enterprise network, the graph including nodes and edges between nodes, a set of nodes representing respective assets within the enterprise network, and a node representing a process executed within a system of the enterprise, each edge representing at least a portion of one or more lateral paths between assets in the enterprise network, determining, for each asset, a contribution value indicating a contribution of a respective asset to operation of the process, determining, for each asset, an impact value based on a total value of the process and a respective contribution value of the asset, and implementing one or more remediations based on a set of impact values determined for the assets, each remediation mitigating a cybersecurity risk within the enterprise network.

24 Claims, 8 Drawing Sheets

Related U.S. Application Data

(60) Provisional application No. 62/829,696, filed on Apr. 5, 2019, provisional application No. 62/774,516, filed on Dec. 3, 2018.

(51) Int. Cl.

| | |
|---|---|
| *G06F 16/901* | (2019.01) |
| *H04L 41/14* | (2022.01) |
| *H04L 43/026* | (2022.01) |
| *G06F 21/57* | (2013.01) |
| *G06Q 10/0631* | (2023.01) |

(52) U.S. Cl.
CPC ............ *H04L 41/14* (2013.01); *H04L 43/026* (2013.01); *H04L 63/1433* (2013.01); *H04L 63/20* (2013.01); *G06F 2221/034* (2013.01); *G06Q 10/06315* (2013.01)

(58) Field of Classification Search
CPC ... H04L 41/142; H04L 41/5058; H04L 41/22; H04L 43/026; H04L 43/0823; H04L 63/1433; H04L 63/20; G06Q 10/06315; Y02P 90/80
See application file for complete search history.

(56) References Cited

U.S. PATENT DOCUMENTS

| | | | |
|---|---|---|---|
| 6,487,666 | B1 | 11/2002 | Shanklin et al. |
| 7,540,025 | B2 | 5/2009 | Tzadikario |
| 7,703,138 | B2 | 4/2010 | Desai et al. |
| 7,904,962 | B1 | 3/2011 | Jajodia et al. |
| 8,099,760 | B2 | 1/2012 | Cohen et al. |
| 8,176,561 | B1 | 5/2012 | Hurst et al. |
| 8,656,493 | B2 | 2/2014 | Capalik |
| 8,881,288 | B1 | 11/2014 | Levy et al. |
| 9,166,997 | B1* | 10/2015 | Guo ............... G06F 21/554 |
| 9,256,739 | B1 | 2/2016 | Roundy et al. |
| 9,563,771 | B2 | 2/2017 | Lang et al. |
| 9,633,306 | B2 | 4/2017 | Liu et al. |
| 9,992,219 | B1* | 6/2018 | Hamlet ............... H04L 63/1433 |
| 10,084,804 | B2 | 9/2018 | Kapadia et al. |
| 10,291,645 | B1 | 5/2019 | Frantzen et al. |
| 10,382,473 | B1 | 8/2019 | Ashkenazy et al. |
| 10,447,721 | B2 | 10/2019 | Lasser |
| 10,447,727 | B1 | 10/2019 | Hecht |
| 10,601,854 | B2 | 3/2020 | Lokamathe et al. |
| 10,642,840 | B1 | 5/2020 | Attaluri et al. |
| 10,659,488 | B1 | 5/2020 | Rajasooriya et al. |
| 10,771,492 | B2 | 9/2020 | Hudis et al. |
| 10,848,515 | B1 | 11/2020 | Pokhrel et al. |
| 10,868,825 | B1 | 12/2020 | Dominessy et al. |
| 10,873,533 | B1 | 12/2020 | Ismailsheriff et al. |
| 10,956,566 | B2 | 3/2021 | Shu et al. |
| 10,958,667 | B1 | 3/2021 | Maida et al. |
| 11,038,900 | B2* | 6/2021 | Jusko ............... H04L 63/1416 |
| 11,089,040 | B2 | 8/2021 | Jang et al. |
| 11,128,654 | B1 | 9/2021 | Joyce et al. |
| 11,159,555 | B2 | 10/2021 | Hadar et al. |
| 11,184,385 | B2 | 11/2021 | Hadar et al. |
| 11,232,235 | B2 | 1/2022 | Hadar et al. |
| 11,277,431 | B2 | 3/2022 | Hassanzadeh et al. |
| 11,281,806 | B2* | 3/2022 | Hadar ............... H04L 63/1433 |
| 11,283,824 | B1 | 3/2022 | Berger et al. |
| 11,283,825 | B2 | 3/2022 | Grabois et al. |
| 11,411,976 | B2 | 8/2022 | Basovskiy et al. |
| 11,483,213 | B2 | 10/2022 | Engelberg et al. |
| 11,533,332 | B2 | 12/2022 | Engelberg et al. |
| 11,676,087 | B2 | 6/2023 | Hogg |
| 2002/0104014 | A1* | 8/2002 | Zobel ............... G06F 21/577 726/26 |
| 2005/0138413 | A1 | 6/2005 | Lippmann et al. |
| 2005/0193250 | A1* | 9/2005 | Takeuchi ............... G06F 21/552 714/15 |
| 2005/0193430 | A1 | 9/2005 | Cohen et al. |
| 2006/0037077 | A1 | 2/2006 | Gadde et al. |
| 2008/0044018 | A1 | 2/2008 | Scrimsher et al. |
| 2008/0289039 | A1 | 11/2008 | Rits et al. |
| 2008/0301765 | A1 | 12/2008 | Nicol et al. |
| 2009/0077666 | A1 | 3/2009 | Chen et al. |
| 2009/0138590 | A1 | 5/2009 | Lee et al. |
| 2009/0307772 | A1 | 12/2009 | Markham et al. |
| 2009/0319248 | A1 | 12/2009 | White et al. |
| 2010/0058456 | A1 | 3/2010 | Jajodia et al. |
| 2010/0138925 | A1 | 7/2010 | Barai et al. |
| 2010/0174670 | A1 | 7/2010 | Malik et al. |
| 2011/0035803 | A1 | 2/2011 | Lucangeli Obes et al. |
| 2011/0061104 | A1 | 3/2011 | Sarraute Yamada et al. |
| 2011/0093916 | A1 | 4/2011 | Lang et al. |
| 2011/0093956 | A1 | 4/2011 | Laarakkers et al. |
| 2013/0097125 | A1 | 4/2013 | Marvasti et al. |
| 2013/0219503 | A1 | 8/2013 | Amnon et al. |
| 2014/0082738 | A1 | 3/2014 | Bahl |
| 2014/0173740 | A1 | 6/2014 | Albanese et al. |
| 2015/0047026 | A1 | 2/2015 | Neil et al. |
| 2015/0106867 | A1 | 4/2015 | Liang |
| 2015/0199207 | A1 | 7/2015 | Lin et al. |
| 2015/0261958 | A1 | 9/2015 | Hale et al. |
| 2015/0326601 | A1 | 11/2015 | Grondin et al. |
| 2015/0350018 | A1 | 12/2015 | Hui et al. |
| 2016/0105454 | A1 | 4/2016 | Li et al. |
| 2016/0205122 | A1 | 7/2016 | Bassett |
| 2016/0277423 | A1 | 9/2016 | Apostolescu et al. |
| 2016/0292599 | A1 | 10/2016 | Andrews et al. |
| 2016/0301704 | A1 | 10/2016 | Hassanzadeh et al. |
| 2016/0301709 | A1 | 10/2016 | Hassanzadeh et al. |
| 2017/0012836 | A1 | 1/2017 | Tongaonkar et al. |
| 2017/0032130 | A1 | 2/2017 | Joseph et al. |
| 2017/0041334 | A1 | 2/2017 | Kahn et al. |
| 2017/0078322 | A1 | 3/2017 | Seiver et al. |
| 2017/0085595 | A1 | 3/2017 | Ng et al. |
| 2017/0163506 | A1 | 6/2017 | Keller |
| 2017/0230410 | A1 | 8/2017 | Hassanzadeh et al. |
| 2017/0286690 | A1 | 10/2017 | Chari et al. |
| 2017/0318050 | A1* | 11/2017 | Hassanzadeh ...... H04L 63/1433 |
| 2017/0324768 | A1 | 11/2017 | Crabtree et al. |
| 2017/0364702 | A1 | 12/2017 | Goldfarb et al. |
| 2017/0366416 | A1 | 12/2017 | Beecham et al. |
| 2018/0013771 | A1 | 1/2018 | Crabtree et al. |
| 2018/0103052 | A1 | 4/2018 | Choudhury et al. |
| 2018/0152468 | A1 | 5/2018 | Nor et al. |
| 2018/0159890 | A1 | 6/2018 | Warnick et al. |
| 2018/0183827 | A1 | 6/2018 | Zorlular et al. |
| 2018/0255077 | A1 | 9/2018 | Paine |
| 2018/0255080 | A1 | 9/2018 | Paine |
| 2018/0295154 | A1 | 10/2018 | Crabtree et al. |
| 2018/0367548 | A1 | 12/2018 | Stokes, III et al. |
| 2019/0052663 | A1 | 2/2019 | Lee et al. |
| 2019/0052664 | A1 | 2/2019 | Kibler et al. |
| 2019/0132344 | A1 | 5/2019 | Lem et al. |
| 2019/0141058 | A1 | 5/2019 | Hassanzadeh et al. |
| 2019/0182119 | A1 | 6/2019 | Ratkovic et al. |
| 2019/0188389 | A1 | 6/2019 | Peled et al. |
| 2019/0230129 | A1 | 7/2019 | Digiambattista et al. |
| 2019/0312898 | A1 | 10/2019 | Verma et al. |
| 2019/0319987 | A1 | 10/2019 | Levy et al. |
| 2019/0362279 | A1 | 11/2019 | Douglas |
| 2019/0370231 | A1* | 12/2019 | Riggs ............... G06Q 40/06 |
| 2019/0373005 | A1 | 12/2019 | Bassett |
| 2020/0014718 | A1 | 1/2020 | Joseph Durairaj et al. |
| 2020/0042328 | A1 | 2/2020 | Gupta |
| 2020/0042712 | A1 | 2/2020 | Foo et al. |
| 2020/0045069 | A1 | 2/2020 | Nanda et al. |
| 2020/0099704 | A1 | 3/2020 | Lee et al. |
| 2020/0112487 | A1 | 4/2020 | Inamdar et al. |
| 2020/0128047 | A1 | 4/2020 | Biswas et al. |
| 2020/0137104 | A1 | 4/2020 | Hassanzadeh et al. |
| 2020/0175175 | A1 | 6/2020 | Hadar et al. |
| 2020/0177615 | A1 | 6/2020 | Grabois et al. |
| 2020/0177616 | A1 | 6/2020 | Hadar et al. |
| 2020/0177617 | A1* | 6/2020 | Hadar ............... G06F 21/577 |
| 2020/0177618 | A1 | 6/2020 | Hassanzadeh et al. |
| 2020/0177619 | A1 | 6/2020 | Hadar et al. |

(56) References Cited

U.S. PATENT DOCUMENTS

| | | | |
|---|---|---|---|
| 2020/0272972 A1 | 8/2020 | Harry et al. | |
| 2020/0296137 A1 | 9/2020 | Crabtree et al. | |
| 2020/0311630 A1 | 10/2020 | Risoldi et al. | |
| 2020/0351295 A1 | 11/2020 | Nhlabatsi et al. | |
| 2020/0358804 A1 | 11/2020 | Crabtree et al. | |
| 2021/0006582 A1 | 1/2021 | Yamada et al. | |
| 2021/0014265 A1 | 1/2021 | Hadar et al. | |
| 2021/0099490 A1 | 4/2021 | Crabtree et al. | |
| 2021/0105294 A1 | 4/2021 | Kruse et al. | |
| 2021/0168175 A1 | 6/2021 | Crabtree et al. | |
| 2021/0173711 A1* | 6/2021 | Crabtree | G06F 16/9024 |
| 2021/0218770 A1 | 7/2021 | Ben-Yosef et al. | |
| 2021/0248443 A1 | 8/2021 | Shu et al. | |
| 2021/0273978 A1 | 9/2021 | Hadar et al. | |
| 2021/0288995 A1 | 9/2021 | Attar et al. | |
| 2021/0336981 A1 | 10/2021 | Akella et al. | |
| 2021/0406675 A1* | 12/2021 | Carcano | G06N 3/084 |
| 2021/0409426 A1 | 12/2021 | Engelberg et al. | |
| 2021/0409439 A1 | 12/2021 | Engelberg et al. | |
| 2022/0014445 A1 | 1/2022 | Engelberg et al. | |
| 2022/0014534 A1 | 1/2022 | Basovskiy et al. | |
| 2022/0021698 A1 | 1/2022 | Hadar et al. | |
| 2022/0038491 A1 | 2/2022 | Hadar et al. | |
| 2022/0051111 A1 | 2/2022 | Hadar et al. | |
| 2022/0070202 A1 | 3/2022 | Busany et al. | |
| 2022/0124115 A1 | 4/2022 | Grabois et al. | |
| 2022/0129590 A1 | 4/2022 | Hadar et al. | |
| 2022/0131894 A1 | 4/2022 | Hassanzadeh et al. | |
| 2022/0150270 A1 | 5/2022 | Klein et al. | |
| 2022/0182406 A1 | 6/2022 | Inokuchi | |
| 2022/0263855 A1 | 8/2022 | Engelberg et al. | |
| 2022/0337617 A1 | 10/2022 | Basovskiy et al. | |
| 2023/0021961 A1 | 1/2023 | Engelberg et al. | |
| 2023/0034910 A1 | 2/2023 | Engelberg et al. | |
| 2023/0067128 A1 | 3/2023 | Engelberg et al. | |
| 2023/0067777 A1 | 3/2023 | Hadar et al. | |
| 2023/0076372 A1 | 3/2023 | Engelberg et al. | |

FOREIGN PATENT DOCUMENTS

| | | |
|---|---|---|
| EP | 2385676 | 11/2011 |
| EP | 2816773 | 12/2014 |
| EP | 3644579 | 4/2020 |
| EP | 3664411 | 6/2020 |
| WO | WO 2018/002484 | 1/2018 |
| WO | WO 2020/242275 | 12/2020 |

OTHER PUBLICATIONS

Brazhuk, "Towards automation of threat modeling based on a semantic model of attack patterns and weaknesses," arXiv, Dec. 8, 2021, arXiv:2112.04231v1, 14 pages.

EP Extended Search Report in European Appln. No. 22157487.4, dated Jun. 9, 2022, 10 pages.

Hemberg et al., "BRON—Linking Attack Tactics, Techniques, and Patterns with Defensive Weaknesses, Vulnerabilities and Affected Platform Configurations," arXiv, Oct. 1, 2020, arXiv:2010.00533v1, 14 pages.

Hemberg et al., "Using a Collated Cybersecurity Dataset for Machine Learning and Artificial Intelligence," arXiv, Aug. 5, 2021, arXiv:2108.02618v1, 5 pages.

Horrocks et al., "SWRL: A Semantic Web Rule Language Combining OWL and RuleML," W3C Member Submission, May 21, 2004, 24 pages.

Neo4j.com [online], "Topological link prediction," available on or before May 17, 2020, via Internet Archive: Wayback Machine URL<https://web.archive.org/web/20200517111258/https://neo4j.com/docs/graph-data-science/current/algorithms/linkprediction/>, retrieved on Jun. 14, 2022, retrieved from URL<https://neo4j.com/docs/graph-data-science/current/algorithms/linkprediction/>, 2 pages.

Rossi et al., "Knowledge Graph Embedding for Link Prediction: A Comparative Analysis," arXiv, Feb. 3, 2020, arXiv:2002.00819v1, 42 pages.

Wikipedia.org [online], "Natural language processing," last updated Jun. 10, 2022, retrieved on Jun. 14, 2022, retrieved from URL<https://en.wikipedia.org/wiki/Natural_language_processing>, 13 pages.

3DS.com [online], "New Customer Experience," available on or before Aug. 7, 2020 via Internet Archive: Wayback Machine URL<https://web.archive.org/web/20200807204455/https://ifwe.3ds.com/transportation-mobility/new-customer-experience>, retrieved on Jul. 9, 2021, retrieved from URL<https://ifwe.3ds.com/transportation-mobility/new-customer-experience>, 9 pages.

Abraham et al., "Cyber Security Analytics: A Stochastic Model for Security Quantification Using Absorbing Markov Chains," Journal of Communications, Dec. 2014, 9(12):899-907.

Alvarenga et al., "Discovering Attack Strategies Using Process Mining," Presented at Proceedings of The Eleventh Advanced International Conference on Telecommunications, Brussels, Belgium, Jun. 21-26, 2015, 119-125.

Amar et al., "Using finite-state models for log differencing," Proceedings of the 2018 26th ACM Joint Meeting on European Software Engineering Conference and Symposium on the Foundations of Software Engineering (ESEC/FSE 2018), Lake Buena Vista, Florida, Nov. 4-9, 2018, 49-59.

Atoum et al., "A holistic cyber security implementation framework," Information Management & Computer Security, Jul. 2014, 22(3):251-264.

Barik et al., "Attack Graph Generation and Analysis Techniques," Defence Science Journal, Nov. 2016, 66(6):559-567.

Barrère et al., "Naggen: a Network Attack Graph GENeration Tool—IEE CNS 17 Poster," 2017 IEEE Conference on Communications and Network Security, Oct. 2017, Las Vegas, NV, USA, 378-379.

Bonacich, "Power and Centrality: A Family of Measures," American Journal of Sociology, Mar. 1987, 92(5):1170-1182.

Borgatti et al., "A Graph-theoretic perspective on centrality," Social Networks, Oct. 2006, 28(4):466-484.

Challenge.org [online], "Incorporating digital twin into internet cyber security—creating a safer future," May 2018, retrieved on Jul. 9, 2021, retrieved from URL<https://www.challenge.org/insights/digital-twin-cyber-security/>, 10 pages.

Chen et al., "Distributed Attack Modeling Approach Based on Process Mining and Graph Segmentation," Entropy, Sep. 2020, 22(9):1026, 21 pages.

Cohen-Addad et al., "Hierarchical Clustering: Objective Functions and Algorithms," Journal of the ACM, Jun. 2019, 66(4):26, 42 pages.

Coltellese et al., "Triage of IoT Attacks Through Process Mining," Presented at Proceedings of On the Move to Meaningful Internet Systems Conference 2019, Rhodes, Greece, Oct. 21-25, 2019; Lecture Notes in Computer Science, Oct. 2019, 11877:326-344.

EP Extended Search Report in European Appln. No. 21191752.1, dated Jan. 4, 2022, 8 pages.

EP Search Report in European Application No. EP 19212981, dated Mar. 4, 2020, 6 pages.

EP Search Report in European Application No. EP13290145, dated Nov. 12, 2013, 2 pages.

EP Search Report in European Application No. EP19212974, dated Feb. 14, 2020, 8 pages.

EP Search Report in European Application No. EP19212976, dated Feb. 14, 2020, 8 pages.

EP Search Report in European Application. No. 21159421.3, dated Jun. 30, 2021, 11 pages.

EP Search Report in European Application. No. EP20185251, dated Oct. 21, 2020, 7 pages.

Fielder et al., "Decision support approaches for cyber security investment," Decision Support Systems, Jun. 2016, 86:13-23.

Foundations of Databases, 1st ed., Abiteboul et al. (eds.), 1995, Chapter 12, 38 pages.

Fundamentals of Business Process Management, 2nd ed., Dumas et al. (eds.), 2018, 546 pages.

GE.com [online], "Predix Platform," available on or before Nov. 16, 2018 via Internet Archive: Wayback Machine URL<https://web.archive.org/web/20181116005032/https://www.ge.com/digital/iiot-platform>, retrieved on Jul. 9, 2021, retrieved from URL<https://www.ge.com/digital/iiot-platform>, 6 pages.

(56) References Cited

OTHER PUBLICATIONS

Gergeleit et al., "Modeling Security Requirements and Controls for an Automated Deployment of Industrial IT Systems," Kommunikation und Bildverarbeitung in der Automation. Technologien für die intelligente Automation (Technologies for Intelligent Automation), Jan. 14, 2020, 12:217-231.

Grieves, "Virtually Intelligent Product Systems: Digital and Physical Twins", Complex Systems Engineering: Theory and Practice, Jul. 2019, 256:175-200.

Hadar et al., "Big Data Analytics on Cyber Attack Graphs for Prioritizing Agile Security Requirements", Proceedings of the 2019 IEEE 27th International Requirements Engineering Conference, Sep. 23-27, 2019, Jeju Island, Kora, 330-339.

Hadar et al., "Cyber Digital Twin Simulator for Automatic Gathering and Prioritization of Security Controls Requirements," Proceedings of the 2020 IEEE 28th International Requirements Engineering Conference, Aug. 31-Sep. 4, 2020, Zurich, Switzerland, 250-259.

Hansen et al., "Model-in-the-Loop and Software-in-the-Loop Testing of Closed-Loop Automotive Software with Arttest," Informatik, 2017, 13 pages.

Hasan et al., "Towards Optimal Cyber Defense Remediation in Energy Delivery Systems", Proceedings of 2019 IEEE Global Communications Conference, Dec. 9-13, 2019, Waikoloa, Hawaii, 7 pages.

Hofner et al., "Dijkstra, Floyd and Warshall meet Kleene," Formal Aspects of Computing, Jul. 2012, 24(4-6):459-476.

Husák et al., "Survey of Attack Projection, Prediction, and Forecasting in Cyber Security," IEEE Communications Surveys & Tutorials, Sep. 24, 2018, 21(1):640-660.

Idika et al., "Extending attack graph-based security metrics and aggregating their application," IEEE Transactions on Dependable and Secure Computing, Jan./Feb. 2012, 9(1):75-85.

IEEE, "IEEE Standard for eXtensible Event Stream (XES) for Achieving Interoperability in Event Logs and Event Stream," IEEE Std 1849™-2016, Sep. 22, 2016, 50 pages.

IEEE.org [online], "This Car Runs on Code," Feb. 1, 2009, retrieved on Jul. 9, 2021, retrieved from URL<https://spectrum.ieee.org/transportation/systems/this-car-runs-on-code>, 5 pages.

Ingols et al., "Practical Attack Graph Generation for Network Defense," 2006 22nd Annual Computer Security Applications Conference (ACSAC'06), Miami Beach, Florida, Dec. 11-15, 2006, 10 pages.

International Organization for Standardization, "International Standard: ISO/IEC 27001," ISO/IEC 27001:2013(E), Oct. 1, 2013, 29 pages.

Joint Task Force Transformation Initiative, "Security and Privacy Controls for Federal Information Systems and Organizations," National Institute of Standards and Technology Special Publication 800-53, Revision 4, Jan. 22, 2015, 462 pages.

Khouzani et al., "Scalable min-max multi-objective cyber-security optimization over probabilistic attack graphs", European Journal of Operational Research, Nov. 1, 2019, 278(3):894-903.

Li et al., "Cluster security research involving the modeling of network exploitations using exploitation graphs," Proceedings of the IEEE International Symposium on Cluster Computing and the Grid, Singapore, May 16-19, 2006, 11 pages.

Lippmann et al., "Validating and restoring defense in depth using attack graphs," Proceedings of the Military Communications Conference, Washington, DC, USA, Oct. 23-25, 2006, 10 pages.

Lu et al., "Ranking attack graphs with graph neural networks," Proceedings of the 5th International Conference on Information Security Practice and Experience, Xi'an, China, Apr. 13-15, 2009; Lecture Notes in Computer Science, Apr. 2009, 5451:345-359.

Manning Free Content Center [online], "Building Your Vocabulary," dated May 19, 2017, retrieved on Jun. 3, 2020, retrieved from URL <https://freecontent.manning.com/building-your-vocabulary/>, 10 pages.

MaschinenMarkt.international [online], "Digital twin in the automobile industry," Aug. 1, 2019, retrieved on Jul. 9, 2021, retrieved from URL<https://www.maschinenmarkt.international/digital-twin-in-the-automobile-industry-a-851549/>, 3 pages.

Mashable.com [online], "Ford ready to innovate, but not at the expense of customer needs," May 31, 2016, retrieved on Jul. 9, 2021, retrieved from URL<https://mashable.com/article/mark-fields-ford-codecon>, 7 pages.

Mehta et al., "Ranking attack graphs," Proceedings of the International Conference on Recent Advances in Intrusion Detection, Hamburg, Germany, Sep. 20-22, 2006; Lecture Notes in Computer Science, Sep. 2006, 4219:127-144.

Murata, "Petri Nets: Properties, Analysis and Applications," Proceedings of the IEEE, Apr. 1989, 77(4):541-580.

Narmeen Zakaria Bawany; DDoS Attack Detection and Mitigation Using SON: Methods, Practices, and Solutions; SPRINGER-2017; p. 425-441.

National Institute of Standards and Technology [online], "National Vulnerability Database," last updated Jun. 2, 2020, retrieved on Jun. 3, 2020, retrieved from URL<https://nvd.nist.gov/>, 4 pages.

Neo4j.com [online], "Random Walk," available on or before Aug. 6, 2020 via Internet Archive: Wayback Machine URL<https://web.archive.org/web/20200806193136/https://neo4j.com/docs/graph-data-science/current/alpha-algorithms/random-walk/>, retrieved on Jul. 28, 2021, retrieved from URL<https://neo4j.com/docs/graph-data-science/current/alpha-algorithms/random-walk/>, 7 pages.

Neo4j.com [online], "Yen's K-Shortest Paths," available on or before Aug. 6, 2020 via Internet Archive: Wayback Machine URL<https://web.archive.org/web/20200806185626/https://neo4j.com/docs/graph-data-science/current/alpha-algorithms/yen-s-k-shortest-path/, retrieved on Jul. 28, 2021, retrieved from URL<https://web.archive.org/web/20200806185626/https://neo4j.com/docs/graph-data-science/current/alpha-algorithms/yen-s-k-shortest-path/>, 5 pages.

Networks: An Introduction, Newman (ed.), May 2010, 789 pages.

Noel et al., "CyGraph: Graph-Based Analytics and Visualization for Cybersecurity," Handbook of Statistics, Jan. 2016, 35:117-167.

Ortalo et al., "Experimenting with quantitative evaluation tools for monitoring operational security," IEEE Transactions on Software Engineering, Sep./Oct. 1999, 25(5):633-650.

Ou et al., "A Scalable Approach to Attack Graph Generation," Proceedings of the 13th ACM Conference on Computer and Communication Security, Oct. 2006, 336-345.

Ou et al., "MulVAL: A Logic-based Network Security Analyzer," 14th USENIX Security Symposium, Aug. 2005, Baltimore, MD, USA, 16 pages.

Phillips et al., "A graph-based system for network-vulnerability analysis," Proceedings of the 1998 Workshop on New Security Paradigms, Charlottesville, Virginia, Sep. 22-26, 1998, 71-79.

PM4Py.de [online], "DFG: Process Discovery using Directly-Follows Graphs," available on or before Mar. 7, 2019 via Internet Archive: Wayback Machine URL<https://web.archive.org/web/20190307062454/http://pm4py.pads.rwth-aachen.de/documentation/process-discovery/dfg/>, retrieved on Jul. 28, 2021, retrieved from URL<https://web.archive.org/web/20190307062454/http://pm4py.pads.rwth-aachen.de/documentation/process-discovery/dfg/>, 4 pages.

PM4Py.de [online], "Process Discovery," available on or before Jun. 26, 2020 via Internet Archive: Wayback Machine URL<https://web.archive.org/web/20200626094921/https://pm4py.fit.fraunhofer.de/documentation#discovery>, retrieved on Jul. 28, 2021, retrieved from URL<https://pm4py.fit.fraunhofer.de/documentation#discovery>, 5 pages.

Process Mining, 1st ed., van der Aalst, 2011, Chapters 5-6, 63 pages.

Purvine et al., "A Graph-Based Impact Metric for Mitigating Latheral Movement Cyber Attacks", Automated Descision Making for Active Cyber Defence, Oct. 2016, pp. 45-52.

Q. Liu et al., "Latte: Large-Scale Lateral Movement Detection," MILCOM 2018—2018 IEEE Military Communications Conference (MILCOM), 2018, pp. 1-6, doi: 10.1109/MILCOM.2018.8599748. (Year: 2018).

Schatz et al., "Economic valuation for information security investment: a systematic literature review," Information Systems Frontiers, Apr. 18, 2016, 19:1205-1228.

Shandilya et al., "Use of Attack Graphs in Security Systems", Hindawi Journal of Computer Networks and Communications, Oct. 20, 2014, 2014:818957, 14 pages.

(56) References Cited

OTHER PUBLICATIONS

Shi et al., "Normalized Cuts and Image Segmentation," IEEE Transactions on Pattern Analysis and Machine Intelligence, Aug. 2000, 22(8):888-905.
Siemens.com [online], "From vehicle design to multi-physical simulations," available on or before Jul. 26, 2019 via Internet Archive: Wayback Machine URL<https://web.archive.org/web/20190726044643/https://new.siemens.com/global/en/markets/automotive-manufacturing/digital-twin-product.html>, retrieved on Jul. 9, 2021, retrieved from URL<https://new.siemens.com/global/en/markets/automotive-manufacturing/digital-twin-product.html>, 11 pages.
SMMT.co.uk [online], "Role of Digital Twin in Automotive Industry," Dec. 17, 2018, retrieved on Jul. 9, 2021, retrieved from URL<https://www.smmt.co.uk/2018/12/role-of-digital-twin-in-automotive-industry/>, 9 pages.
Sourceforge.net [online], "XSB," last updated Oct. 29, 2017, retrieved on Jun. 3, 2020, retrieved from URL <http://xsb.sourceforge.net/>, 2 pages.
Stanek et al., "Method of comparing graph differencing algorithms for software differencing," 2008 IEEE International Conference on Electro/Information Technology, Ames, Iowa, May 18-20, 2008, 482-487.
Strom et al., "MITRE ATT&CK™: Design and Philosophy", The MITRE Corporation, Jul. 2018, 37 pages.
Swiler et al., "A graph-based network-vulnerability analysis system," Sandia National Laboratories, 1997, Tech. Rep. SAND97-3010/1, 25 pages.
TechCrunch.com [online], "Tesla is rolling out its Navigate on Autopilot feature," Oct. 27, 2018, retrieved on Jul. 9, 2021, retrieved from URL<https://techcrunch.com/2018/10/26/tesla-is-rolling-out-its-navigate-on-autopilot-feature/>, 17 pages.
The Fourth Industrial Revolution, 1st. ed., Schwab, Jan. 2017, 218 pages.
The MITRE Corporation [online], "MITRE ATT&CK," last updated May 27, 2020, retrieved on Jun. 3, 2020, retrieved from URL <https://attack.mitre.org/>, 3 pages.
Ullah et al., "Towards Modeling Attacker's Opportunity for Improving Cyber Resilience in Energy Delivery Systems", Resilience Week, Aug. 2018, pp. 100-107.
Van Der Aalst et al., "Causal Nets: A Modeling Language Tailored towards Process Discovery," Presented at Proceedings of CONCUR 2011—Concurrency Theory, Aachen, Germany, Sep. 6-9, 2011; Lecture Notes in Computer Science, Sep. 2011, 6901:28-42.
Vehicle Power Management, 1st ed., Zhang et al (eds.), Aug. 2011, Chapter 10, 27 pages.
Wang et al., "A Network Vulnerability Assessment Method Based on Attack Graph," 2018 IEEE 4th International Conference on Computer and Communications, Dec. 7-10, 2018, Chengdu, China, 1149-1154.
Wang et al., "Exploring Attack Graph for Cost-benefit Security Hardening: A Probabilistic Approach," Computers & Security, Feb. 2013, 32:158-169.
Ward et al., "Threat Analysis and Risk Assessment in Automotive Cyber Security," SAE Int. J. Passeng. Cars Electron. Electr. Systems, May 2013, 6(2):507-513.
Wikipedia.org [online], "5G," last updated Jul. 9, 2021, retrieved on Jul. 9, 2021, retrieved from URL<https://en.wikipedia.org/wiki/5G>, 29 pages.
Wikipedia.org [online], "Active Directory," last updated Jun. 1, 2020, retrieved on Jun. 3, 2020, retrieved from URL <https://en.wikipedia.org/wiki/Active_Directory>, 14 pages.
Wikipedia.org [online], "Backward Chaining," last updated Nov. 16, 2019, retrieved on Jun. 3, 2020, retrieved from URL <https://en.wikipedia.org/wiki/Backward_chaining>, 3 pages.
Wikipedia.org [online], "Breadth-first search," last updated Jul. 21, 2021, retrieved on Jul. 28, 2021, retrieved from URL<https://en.wikipedia.org/wiki/Breadth-first_search>, 6 pages.
Wikipedia.org [online], "Cartesian Product," last updated Feb. 28, 2020, retrieved on Jun. 3, 2020, retrieved from URL <https://en.wikipedia.org/wiki/Cartesian_product>, 9 pages.
Wikipedia.org [online], "Centrality," last updated May 29, 2020, retrieved on Jun. 3, 2020, retrieved from URL <https://en.wikipedia.org/wiki/Centrality>, 15 pages.
Wikipedia.org [online], "Centrality," last updated Oct. 18, 2020, retrieved on Oct. 26, 2020, retrieved from URL<https://en.wikipedia.org/wiki/Centrality>, 15 pages.
Wikipedia.org [online], "Common Vulnerabilities and Exposures," last updated Jul. 6, 2021, retrieved on Jul. 9, 2021, retrieved from URL<https://en.wikipedia.org/wiki/Common_Vulnerabilities_and_Exposures>, 5 pages.
Wikipedia.org [online], "Common Vulnerability Scoring System," last updated Jun. 21, 2021, retrieved on Jul. 9, 2021, retrieved from URL<https://en.wikipedia.org/wiki/Common_Vulnerability_Scoring_System>, 7 pages.
Wikipedia.org [online], "Depth-first search," last updated Jun. 16, 2021, retrieved on Jul. 28, 2021, retrieved from URL<https://en.wikipedia.org/wiki/Depth-first_search>, 8 pages.
Wikipedia.org [online], "Digital twin," last updated Jul. 8, 2021, retrieved on Jul. 9, 2021, retrieved from URL<https://en.wikipedia.org/wiki/Digital_twin>, 13 pages.
Wikipedia.org [online], "Eigenvector centrality," last updated Dec. 1, 2020 retrieved on Jan. 11, 2021, retrieved from URL<https://en.wikipedia.org/wiki/Eigenvector_centrality>, 4 pages.
Wikipedia.org [online], "Flood Fill," last updated Dec. 24, 2019, retrieved on Jun. 3, 2020, retrieved from URL <https://en.wikipedia.org/wiki/Flood_fill>, 7 pages.
Wikipedia.org [online], "Floyd-Warshall algorithm," last updated Jan. 5, 2021, retrieved on Jan. 11, 2021, retrieved from URL<https://en.wikipedia.org/wiki/Floyd%E2%80%93Warshall_algorithm>, 7 pages.
Wikipedia.org [online], "Forward Chaining," last updated Nov. 18, 2019, retrieved on Jun. 3, 2020, retrieved from URL <https://en.wikipedia.org/wiki/Forward_chaining>, 3 pages.
Wikipedia.org [online], "Look-ahead (backtracking)," last updated May 23, 2020, retrieved on Jun. 3, 2020, retrieved from URL <https://en.wikipedia.org/wiki/Look-ahead_(backtracking)>, 3 pages.
Wikipedia.org [online], "SCADA," last updated Jun. 2, 2020, retrieved on Jun. 3, 2020, retrieved from URL <https://en.wikipedia.org/wiki/SCADA>, 12 pages.
Wikipedia.org [online], "Sigmoid function," last updated Dec. 25, 2020, retrieved on Jan. 11, 2021, retrieved from URL<https://en.wikipedia.org/wiki/Sigmoid_function>, 4 pages.
Wikipedia.org [online], "SWOT analysis," last updated Oct. 20, 2020, retrieved on Oct. 26, 2020, retrieved from URL<https://en.wikipedia.org/wiki/SWOT_analysis>, 8 pages.
Wikipedia.org [online], "Traffic congestion," last updated Oct. 5, 2020, retrieved on Oct. 26, 2020, retrieved from URL<https://en.wikipedia.org/wiki/Traffic_congestion>, 24 pages.
Wikipedia.org [online], "Traffic flow," last updated Oct. 19, 2020, retrieved on Oct. 26, 2020, retrieved from URL<https://en.wikipedia.org/wiki/Traffic_flow>, 41 pages.
Wikipedia.org [online], "Zero-day (computing)," last updated Oct. 16, 2020, retrieved on Oct. 26, 2020, retrieved from URL<https://en.wikipedia.org/wiki/Zero-day_(computing)>, 8 pages.
X. Li, C. Zhang, T. Jung, J. Qian and L. Chen, "Graph-based privacy-preserving data publication," IEEE INFOCOM 2016—The 35th Annual IEEE International Conference on Computer Communications, 2016, pp. 1-9, doi: 10.1109/IN F000M.2016.7524584. (Year: 2016).
Xie et al., "Using Bayesian Networks for Cyber Security Analysis," Proceedings of the 2010 IEEE/IFIP International Conference on Dependable Systems & Networks, Jun. 28-Jul. 1, 2010, Chicago, Illinois, 211-220.
Yi et al., "Overview on attack graph generation and visualization technology," 2013 International Conference on Anti-Counterfeiting, Security and Identification (ASID), Shanghai, China, Oct. 25-27, 2013, 6 pages.

(56) References Cited

OTHER PUBLICATIONS

You et al., "A Review of Cyber Security Controls from An ICS Perspective," Proceedings of 2018 International Conference on Platform Technology and Service (PlatCon), Jan. 29-31, 2018, Jeju, South Korea, 5 pages.

Zeng et al., "Survey of Attack Graph Analysis Methods from the Perspective of Data and Knowledge Processing," Hindawi Security and Communication Networks, Dec. 26, 2019, 2019:2031063, 17 pages.

Zhang et al., "Co-simulation framework for design of time-triggered cyber physical systems," 2013 ACM/IEEE International Conference on Cyber-Physical Systems (ICCPS), Philadelphia, Pennsylvania, Apr. 8-11, 2013, 119-128.

Zhang et al., "Optimal Decision-Making Approach for Cyber Security Defense Using Game Theory and Intelligent Learning," Security and Communication Networks, Dec. 23, 2019, 2019:3038586, 17 pages.

Zhao et al., "Attack graph analysis method for large scale network security hardening," J. Front. Comput. Sci. Technology, 2018, 12(2):263-273 (with English Abstract).

Almeida et al., "An ontological analysis of the notion of community in the RM-ODP enterprise language," Computer Standards & Interfaces, Mar. 2013, 35(3):257-268.

Annane et al., "BBO: BPMN 2.0 based ontology for business process representation," Presented at Proceedings of the 20th European Conference on Knowledge Management (ECKM 2019), Lisbonne, Portugal, Sep. 5-6, 2019, 49-59.

Ashton et al., "That 'internet of things' thing," RFID Journal, Jun. 22, 2009, 1 page.

Borgo et al., "Ontological Foundations of DOLCE," Theory and Applications of Ontology: Computer Applications, Aug. 5, 2010, 279-295.

Burger et al., "Scaling to the end of silicon with edge architectures," Computer, Jul. 2004, 37(7):44-55.

Cravero, "Big data architectures and the internet of things: A systematic mapping study," IEEE Latin America Transactions, Apr. 2018, 16(4):1219-1226.

Daniele et al., "An ontological approach to logistics," Enterprise Interoperability: Research and Applications in the Service-oriented Ecosystem, Oct. 11, 2013, 199-213.

Degen et al., "Gol: toward an axiomatized upper-level ontology," Presented at Proceedings of the International Conference on Formal Ontology in Information Systems, Ogunquit, Maine, USA, Oct. 17-19, 2001, 34-46.

Duarte et al., "Towards an Ontology of Requirements at Runtime," Formal Ontology in Information Systems, Jan. 2016, 283:255-268.

El Saddik, "Digital Twins: The Convergence of Multimedia Technologies," IEEE MultiMedia, Apr.-Jun. 2018, 25(2):87-92.

Gailly et al., "Ontological Reengineering of the REA-EO using UFO," Presented at Proceedings of the International Workshop on Ontology-Driven Software Engineering, Orlando, FL, USA, Oct. 2009, 15 pages.

Gandomi et al., "Beyond the hype: Big data concepts, methods, and analytics," International Journal of Information Management, Apr. 2015, 35(2):137-144.

Genovese, "Data mesh: the newest paradigm shift for a distributed architecture in the data world and its application," Thesis for the degree of Computer Engineering, Politecnico di Torino, 2021, 76 pages.

Giunchiglia et al., "Lightweight Ontologies," Technical Report DIT-07-071, University of Trento, Oct. 2007, 10 pages.

Gomez-Perez et al., "Ontology languages for the Semantic Web," IEEE Intelligent Systems, Feb. 2002, 17(1):54-60.

Guarino, "Formal Ontology in Information Systems," Presented at Proceedings of the 1st International Conference, Trento, Italy, Jun. 6-8, 1998, 3-15.

Guizzardi et al., "An Ontology-Based Approach for Evaluating the Domain Appropriateness and Comprehensibility Appropriateness of Modeling Languages," MoDELS, 2005, 691-705.

Guizzardi, "On Ontology, ontologies, Conceptualizations, Modeling Languages, and (Meta)Models," Presented at Proceedings of the 2007 conference on Databases and Information Systems IV: Selected Papers from the Seventh International Baltic Conference, Amsterdam, Netherlands, Jun. 5, 2007, 18 pages.

Guizzardi, "Ontological Foundations for Structural Conceptual Models," Thesis for the degree of Doctor, University of Twente, 2005, 441 pages.

Guizzardi, "Ontology, Ontologies and the 'I' of FAIR," Data Intelligence, Jan. 1, 2020, 2(1-2):181-191.

Guizzardi, "The role of foundational ontology for conceptual modeling and domain ontology representation," Presented at Proceedings of the 7th International Baltic Conference on Databases and Information Systems, Vilnius, Lithuania, Jul. 3-6, 2006, 9 pages.

Hassani et al., "Artificial Intelligence (AI) or Intelligence Augmentation (IA): What Is the Future?," AI, Apr. 12, 2020, 1(2):143-155.

Herre, "General Formal Ontology (GFO): A Foundational Ontology for Conceptual Modelling," Theory and Applications of Ontology: Computer Applications, Aug. 12, 2010, 297-345.

Jacobsen et al., "FAIR Principles: Interpretations and Implementation Considerations," Data Intelligence, Jan. 1, 2020, 2(1-2):10-29.

Machado et al., "Data Mesh: Concepts and Principles of a Paradigm Shift in Data Architectures," Procedia Computer Science, 2022, 196:263-271.

Machado et al., "Data-Driven Information Systems: The Data Mesh Paradigm Shift," Presented at Proceedings of the 29th International Conference on Information Systems Development, Valencia, Spain, Sep. 8-10, 2021, 6 pages.

Makridakis, "The forthcoming artificial intelligence (ai) revolution: Its impact on society and firms," Futures, Jun. 2017, 90:46-60.

Martins et al., "A framework for conceptual characterization of ontologies and its application in the cybersecurity domain," Software and Systems Modeling, Jul. 2, 2022, 21:1437-1464.

Martins et al., "Conceptual Characterization of Cybersecurity Ontologies," The Practice of Enterprise Modelling, Nov. 18, 2020, 323-338.

Mathis, "Data lakes," Datenbank-Spektrum, Oct. 6, 2017, 17(3):289-293.

Monino, "Data Value, Big Data Analytics, and Decision-Making," Journal of the Knowledge Economy, Aug. 20, 2016, 256-267.

Sales et al., "'Ontological anti-patterns in taxonomic structures,'" Presented at Proceedings of ONTOBRAS 2019: XII Seminar on Ontology Research in Brazil, Porto Alegre, Brazil, Sep. 2-5, 2019, 13 pages.

Sitton-Candanedo et al., "A review of edge computing reference architectures and a new global edge proposal," Future Generation Computer Systems, Oct. 2019, 99:278-294.

Tan et al., "Future internet: The Internet of Things," Presented at Proceedings of the 2010 3rd International Conference on Advanced Computer Theory and Engineering (ICACTE), Chengdu, China, Aug. 20-22, 2010.

Uschold et al., "Ontologies: Principles, methods and applications," The Knowledge Engineering Review, Jan. 1996, 11(2):93-136.

Van Heijst et al., "Using explicit ontologies in KBS development," International Journal of Human-Computer Studies, Feb. 1997, 46(2-3):183-292.

Wand et al., "On the deep structure of information systems," Information Systems Journal, Jul. 1995, 5(3):203-223.

Wang et al., "Big data analytics in cyber security: network traffic and attacks," Journal of Computer Information Systems, Jan. 2020, 61(3):1-8.

Wu et al., "A service-oriented architecture for business intelligence," Presented at Proceedings of the IEEE International Conference on Service-Oriented Computing and Applications (SOCA '07), Newport Beach, CA, USA, Jun. 19-20, 2007, 279-285.

Kaloroumakis et al., "Toward a Knowledge Graph of Cybersecurity Countermeasures," Technical Report, The MITRE Corporation, 2021, 11 pages.

MITRE.org [online], "D3FEND," available on or before Jun. 22, 2021 via Internet Archive: Wayback Machine URL<https://web.archive.org/web/20210622142005/https://d3fend.mitre.org/>, retrieved on Jul. 13, 2022, retrieved from URL<https://d3fend.mitre.org/>, 3 pages.

(56) References Cited

OTHER PUBLICATIONS

MITRE.org [online], "Digital Artifact Ontology," available on or before Jun. 25, 2021 via Internet Archive: Wayback Machine URL<https://web.archive.org/web/20210625024718/https://d3fend.mitre.org/dao>, retrieved on Jul. 13, 2022, retrieved from URL<https://d3fend.mitre.org/dao/>, 3 pages.

MITRE.org [online], "Service Application," available on or before Jun. 25, 2021 via Internet Archive: Wayback Machine URL<https://web.archive.org/web/20210625024952/https://d3fend.mitre.org/dao/artifact/d3f:ServiceApplication/>, retrieved on Jul. 13, 2022, retrieved from URL<https://d3fend.mitre.org/dao/artifact/d3f:ServiceApplication/>, 1 page.

Wikipedia.org [online], "Reachability," last updated Oct. 22, 2021, retrieved on Jul. 13, 2022, retrieved from URL<https://en.wikipedia.org/wiki/Reachability>, 5 pages.

Abraham et al. "A Predictive Framework for Cyber Security Analytics Using Attack Graphs." International Journal of Computer Networks & Communications (IJCNC). vol. 7, No. 1, Jan. 2015. (Year: 2015).

CyberSecurityWorks.com [online], "MITRE Mapping of CISA KEVs and its Challenges," Jun. 29, 2022, retrieved on Oct. 4, 2022, retrieved from URL<https://cybersecurityworks.com/blog/cisa/mitre-mapping-of-cisa-kevs-and-its-challenges.html>, 6 pages.

Cycognito.com [online], "Identifying and Managing Vulnerabilities on All Your Attacker-Exposed Assets, All the Time: Benefits of the CyCognito Platform for Vulnerability Management," available on or before Oct. 22, 2020 via Internet Archive: Wayback Machine URL<https://web.archive.org/web/20201022120625/https://www.cycognito.com/vulnerability-management>, retrieved on Oct. 4, 2022, retrieved from URL<https://www.cycognito.com/vulnerability-management>, 15 pages.

Das et al., "V2W-BERT: A Framework for Effective Hierarchical Multiclass Classification of Software Vulnerabilities," CoRR, submitted on Feb. 23, 2021, arXiv:2102.11498v1, 11 pages.

GitHub.com [online], "ALFA-group/BRON," available on or before Nov. 23, 2021 via Internet Archive: Wayback Machine URL<https://web.archive.org/web/20211123023700/https://github.com/ALFA-group/BRON>, retrieved on Oct. 4, 2022, retrieved from URL<https://github.com/ALFA-group/BRON>, 5 pages.

Grigorescu et al., "CVE2ATT&CK: BERT-Based Mapping of CVEs to MITRE ATT&CK Techniques," Algorithms, Aug. 31, 2022, 15(9):314, 22 pages.

Mitre.org [online], "CAPEC: Common Attack Pattern Enumerations and Classifications," available on or before Jul. 21, 2007 via Internet Archive: Wayback Machine URL<https://web.archive.org/web/20070721234158/https://capec.mitre.org/>, retrieved on Oct. 4, 2022, retrieved from URL<https://capec.mitre.org/>, 2 pages.

Mitre.org [online], "CWE: Common Weakness Enumeration," available on or before Oct. 9, 2006 via Internet Archive: Wayback Machine URL<https://web.archive.org/web/20061009060144/https://cwe.mitre.org/>, retrieved on Oct. 4, 2022, retrieved from URL<https://cwe.mitre.org/>, 1 page.

W3.org [online], "SWRL: A Semantic Web Rule Language Combining OWL and RuleML," May 21, 2004, retrieved on Oct. 4, 2022, retrieved from URL<https://www.w3.org/Submission/SWRL/>, 24 pages.

Chen Zhong, Towards Agile Cyber Analysis: Leveraging Visualization as Functions in Collaborative Visual Analytics, IEEE:2017, pp. 1-2.

EP Extended Search Report in European Appln. No. 22187514.9, dated Nov. 29, 2022, 7 pages.

\* cited by examiner

GENERATING ATTACK GRAPHS IN AGILE SECURITY PLATFORMS

CROSS-REFERENCE TO RELATED APPLICATIONS

This application is a continuation of U.S. patent application Ser. No. 16/554,856, filed on Aug. 29, 2019, which claims priority to U.S. Prov. App. No. 62/774,516, filed on Dec. 3, 2018 and U.S. Prov. App. No. 62/829,696, filed on Apr. 5, 2019, the disclosures of which are incorporated herein by reference in their entireties.

BACKGROUND

Computer networks are susceptible to attack by malicious users (e.g., hackers). For example, hackers can infiltrate computer networks in an effort to obtain sensitive information (e.g., user credentials, payment information, address information, social security numbers) and/or to take over control of one or more systems. To defend against such attacks, enterprises use security systems to monitor occurrences of potentially adverse events occurring within a network, and alert security personnel to such occurrences.

One challenge of cyber security is the lack of resources against overwhelming defense missions. Ideally, security requirements should be managed in a holistic view over the entire enterprise, from identity management to compliance hardening of machines, from privacy concerns to data mapping, and from managing cyber issues before an event (proactive prevention), during an event (Cognitive Security Operation Center), and after an event (Cognitive Forensics). In reality, security teams have to drive prioritized decision-making, which allows them to determine the next security requirement that should be addressed from a pool of existing and evolving security requirements across all security aspects. Prioritization of security requirements requires a rationale that justifies suggested remediations to be performed immediately, versus remediations that can be deferred. A cyber-aware organization needs to constantly adjust requirements prioritization due to new emerging threats and evolving computing environments that support an evolving business.

Traditional risk assessment efforts in the area of industrial environments are based on safety and security integration, cyber risk management, and attack-specific modeling. These approaches, however, either propose a new system design that requires fundamental changes in the system architecture, which is not applicable to many industrial businesses, or propose some theoretical approaches without addressing the implementation and scalability challenges in heterogenous industrial environments.

SUMMARY

Implementations of the present disclosure are directed to an agile security platform for enterprise-wide cyber-security. More particularly, implementations of the present disclosure are directed to an agile security platform that determines asset vulnerability of enterprise-wide assets including cyber-intelligence and discovery aspects of enterprise information technology (IT) systems and operational technology (OT) systems, asset value, and potential for asset breach including hacking analytics of enterprise IT/OT systems. The agile security platform of the present disclosure executes in a non-intrusive manner.

In some implementations, actions include providing, by a security platform, graph data defining a graph that is representative of an enterprise network, the graph including nodes and edges between nodes, a set of nodes representing respective assets within the enterprise network, and a node representing a process executed within a system of the enterprise, each edge representing at least a portion of one or more lateral paths between assets in the enterprise network, determining, for each asset, a contribution value indicating a contribution of a respective asset to operation of the process, determining, for each asset, an impact value based on a total value of the process and a respective contribution value of the asset, and implementing one or more remediations based on a set of impact values determined for the assets, each remediation mitigating a cyber-security risk within the enterprise network. Other implementations of this aspect include corresponding systems, apparatus, and computer programs, configured to perform the actions of the methods, encoded on computer storage devices.

These and other implementations can each optionally include one or more of the following features: a contribution value of an asset is set to a maximum value in response to determining that compromise of the asset would result in failure of the process; a contribution value of an asset is set to less than a maximum value in response to determining that compromise of the asset would degrade the process; each remediation is implemented for a respective vulnerability and remediates an issue of a respective asset; the vulnerability affects multiple assets; the graph is generated by a discovery service of the security platform, the discovery service detecting assets using one or more adaptors and respective asset discovery tools that generate an asset inventory and a network map of the enterprise network; each asset is identified as a target within the enterprise network, the target being selected based on a disruption occurring to the process in response to an attack on the target; the disruption is based on one or more metrics; and the one or more metrics include loss of technical resources, physical losses, disruption in services, and financial losses.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
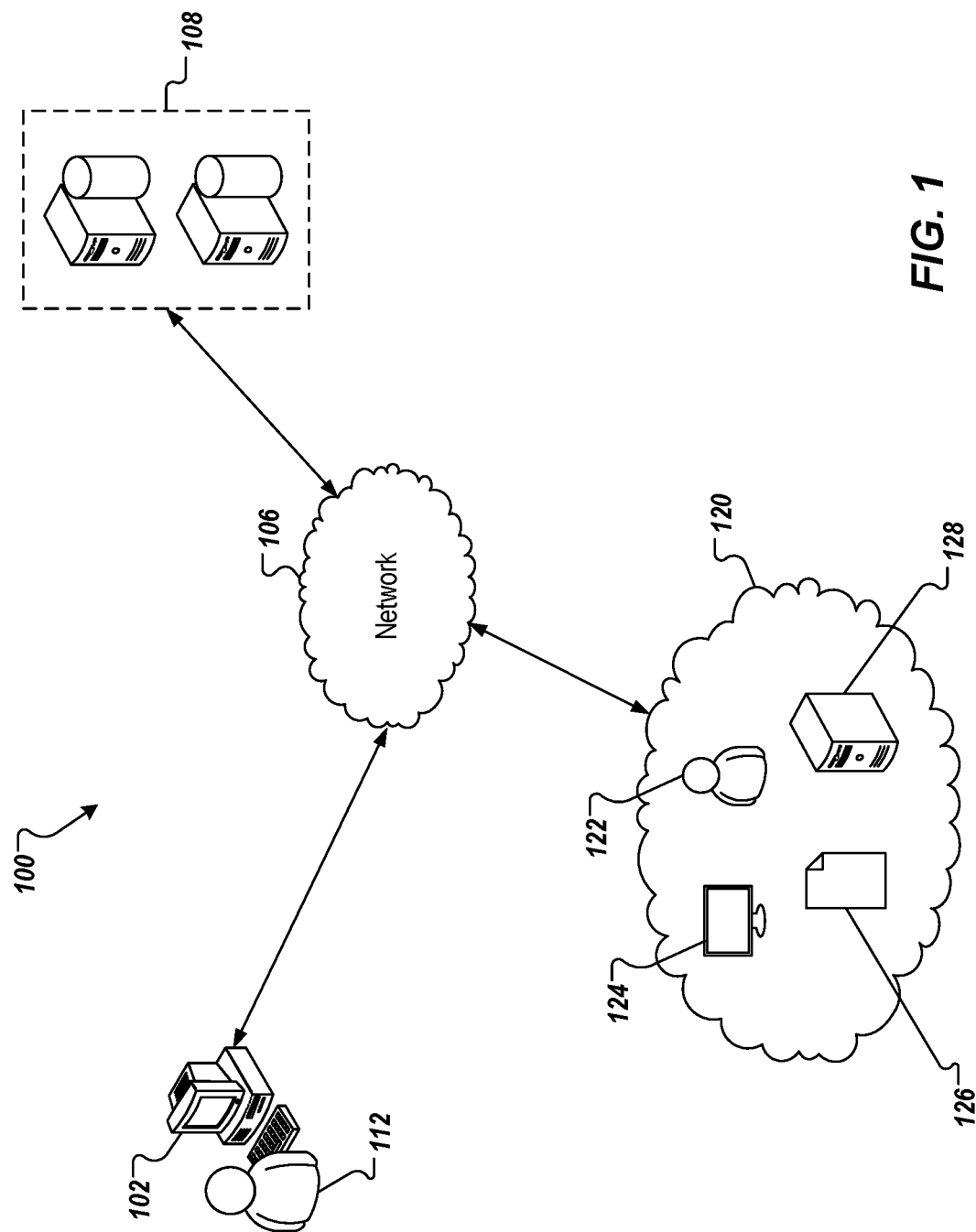
FIG. 1 depicts an example architecture that can be used to execute implementations of the present disclosure.

Implementations of the present disclosure are directed to an agile security platform for enterprise-wide cyber-security. More particularly, implementations of the present disclosure are directed to an agile security platform that determines asset vulnerability of enterprise-wide assets including cyber-intelligence and discovery aspect of enterprise information technology (IT) systems, and enterprise operational technology (OT) systems, asset value, and potential for asset breach including hacking analytics of enterprise IT/OT systems performed in a non-intrusive manner. In general, and as described in further detail herein, the agile security platform of the present disclosure prioritizes risks and respective remediations based on vulnerabilities of assets within an enterprise network (e.g., cyber intelligence and discovery aspect of IT/OT systems), the value of the assets, and the probability that the assets will be breached.

Implementations of the present disclosure are described in detail herein with reference to an example context that includes cyber security and resilience in IT/OT systems. As described herein, implementations of the present disclosure enhance operational efficiency (e.g., time to resolution) in the example use case of cyber threat hunting and cyber resilience (defense). More particularly, implementations of the present disclosure enable users to quickly and efficiently sort and find IT/OT nodes in a graph of assets according to changing computational values of cyber risks. In this manner, prioritization of security tasks is enabled to determine which is the next critical device or problem to address in an attack path (lateral movement).

It is contemplated, however, that implementations of the present disclosure can be realized in any appropriate context. For example, implementations of the present disclosure can be used to provide automatic scaling in IT systems (e.g., controlling network traffic and deciding which additional servers needs to be instantiated, in order to reduce bottle necks in transaction flows). As another example, implementations of the present disclosure can be used to regulate permissions and/or access rights in IT systems (e.g., user permissions and administrator rights for data access for optimizing users credentials for network management, finding the most impactful user and driving moderated authorization management based on risk and recovery).

In view of the example context, and as described in further detail herein, implementations of the present disclosure are directed to determining impact assets within a network have on a process and prioritizing remediations to alleviate vulnerabilities of assets. In some implementations, actions include providing, by a security platform, graph data defining a graph that is representative of an enterprise network, the graph including nodes and edges between nodes, a set of nodes representing respective assets within the enterprise network, and a node representing a process executed within a system of the enterprise, each edge representing at least a portion of one or more lateral paths between assets in the enterprise network, determining, for each asset, a contribution value indicating a contribution of a respective asset to operation of the process, determining, for each asset, an impact value based on a total value of the process and a respective contribution value of the asset, and implementing one or more remediations based on a set of impact values determined for the assets, each remediation mitigating a cyber-security risk within the enterprise network.

In some implementations, the agile security platform of the present disclosure enables continuous cyber and enterprise-operations alignment controlled by risk management. The agile security platform of the present disclosure improves decision-making by helping enterprises to prioritize security actions that are most critical to their operations. In some implementations, the agile security platform combines methodologies from agile software development lifecycle, IT management, development operations (DevOps), and analytics that use artificial intelligence (AI). In some implementations, agile security automation bots continuously analyze attack probability, predict impact, and recommend prioritized actions for cyber risk reduction. In this manner, the agile security platform of the present disclosure enables enterprises to increase operational efficiency and availability, maximize existing cyber-security resources, reduce additional cyber-security costs, and grow organizational cyber resilience.

As described in further detail herein, the agile security platform of the present disclosure provides for discovery of IT/OT supporting elements within an enterprise, which elements can be referred to as configuration items (CI). Further, the agile security platform can determine how these CIs are connected to provide a CI network topology. In some examples, the CIs are mapped to processes and services of the enterprise, to determine which CIs support which services, and at what stage of an operations process. In this manner, a services CI topology is provided.

In some implementations, the specific vulnerabilities of each CI are determined, and enable a list of risks to be mapped to the specific IT/OT network of the enterprise. Further, the agile security platform of the present disclosure can determine what a malicious user (hacker) could do within the enterprise network, and whether the malicious user can leverage additional elements in the network such as scripts, CI configurations, and the like. Accordingly, the agile security platform enables analysis of the ability of a malicious user to move inside the network, namely, lateral movement within the network. This includes, for example, how a malicious user could move from one CI to another CI, what CI (logical or physical) can be damaged, and, consequently, damage to a respective service provided by the enterprise.

FIG. 1 depicts an example architecture 100 in accordance with implementations of the present disclosure. In the depicted example, the example architecture 100 includes a client device 102, a network 106, and a server system 108. The server system 108 includes one or more server devices and databases (e.g., processors, memory). In the depicted example, a user 112 interacts with the client device 102.

In some examples, the client device 102 can communicate with the server system 108 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 108 includes at least one server and at least one data store. In the example of FIG. 1, the server system 108 is intended to represent various forms of servers including, but not limited to a web server, an application server, a proxy server, a network server, and/or a server pool. In general, server systems accept requests for application services and provides such services to any number of client devices (e.g., the client device 102 over the network 106). In accordance with implementations of the present disclosure, and as noted above, the server system 108 can host an agile security platform.

In the example of FIG. 1, an enterprise network 120 is depicted. The enterprise network 120 represents a network implemented by an enterprise to perform its operations. In some examples, the enterprise network 120 represents on-premise systems (e.g., local and/or distributed), cloud-based systems, and/or combinations thereof. In some examples, the enterprise network 120 includes IT systems and OT systems. In general, IT systems include hardware (e.g., computing devices, servers, computers, mobile devices) and software used to store, retrieve, transmit, and/or manipulate data within the enterprise network 120. In general, OT systems include hardware and software used to monitor and detect or cause changes in processes within the enterprise network 120.

In some implementations, the agile security platform of the present disclosure is hosted within the server system 108, and monitors and acts on the enterprise network 120, as described herein. More particularly, and as described in further detail herein, the agile security platform detects IT/OT assets and generates an asset inventory and network maps, as well as processing network information to discover vulnerabilities in the enterprise network 120. Further, the agile security platform provides a holistic view of network and traffic patterns. In some examples, the enterprise network 120 includes multiple assets. Example assets include, without limitation, users 122, computing devices 124, electronic documents 126, and servers 128.

In some implementations, the agile security platform provides one or more dashboards, alerts, notifications and the like to cyber-security personnel that enable the cyber-security personnel to react to and remediate security relevant events. For example, the user 112 can include a cyber-security expert that views and responds to dashboards, alerts, and/or notifications of the agile security platform using the client device 102.

In accordance with implementations of the present disclosure, the agile security platform operates over multiple phases. Example phases include an asset discovery, anomaly detection, and vulnerability analysis phase, a cyber resilience risk analysis phase, and a cyber resilience risk recommendation phase.

With regard to the asset discovery, anomaly detection, and vulnerability analysis phase, discovering what vulnerabilities exit across the vertical stack and the relevant use cases is imperative to be conducted from the enterprise IT to the control systems. A focus of this phase is to generate the security backlog of issues, and potential remediations.

Rather than managing each technology layer separately, the agile security platform of the present disclosure addresses lateral movements across the stack. Through devices, communication channels (e.g., email), and/or operation systems, vulnerabilities are addressed within the context of a service (e.g., a service that the enterprise offers to customers), and a cyber kill chain to a target in the operation vertical, generating operation disturbance by manipulation of data. The notion of a CI assists in mapping dependencies between IT elements within a configuration management DB (CMDB). A so-called security CI (SCI) maps historical security issues of a certain managed security element and is mapped into a security aspect of a digital twin.

As a result, a stack of technologies is defined, and is configured in a plug-in reference architecture (replaceable and extensible) manner. The stack addresses different aspects of monitoring, harvesting, and alerting of information within different aggregations views (dashboards) segmented according to owners and relevant IT and security users. An example view includes a health metric inserted within the dashboard of an enterprise application. In some examples, the health metric indicates the security condition of the underlying service and hence, the reliability of the provided data and information. Similar to risks that can be driven by labor, inventory, or energy, security risk concern can be presented and evaluated in the operations-level, drilled-through for additional transparency of the issue, and can be optimally remediated by allocating investments to automation or to security and IT personal with adequate operations awareness.

With regard to the cyber resilience risk analysis phase, each vulnerability may have several remediations, and each has a cost associated with it, either per internal personnel time, transaction, service, or retainer, as well as the deferred cost of not acting on the issue. A focus of this phase is to enable economical decision-making of security investments, either to be conducted by the IT and security team or directly by automation, and according to risk mitigation budget.

In further detail, observing a single-issue type and its remediations does not reflect the prioritization between multiple vulnerabilities. Traditional systems are based on global risk assessment, yet the context in which the SCI is part of is missing. The overall risk of a process matters differently for each enterprise. As such, remediation would occur according to gradual hardening of a process according to prioritization, driven in importance and responsibility by the enterprise, not by gradual hardening of all devices, for example, in the organization according to policy, without understanding of the impact on separated operational processes. Hardening of a system should be a decision of the enterprise to drive security alignment with the enterprise.

In addition, as the system is changed by gradual enforcement and hardening, new issues are detected and monitored. Hence, making a big bang decision may be not relevant to rising risks as they evolve. Prioritization according to value is the essence of this phase. It is a matter of what is important for the next immediate term, according to overall goals, yet considering changes to the environment.

With regard to the cyber resilience risk recommendation phase, a focus is to simplify approved changes and actions by proactive automation. In traditional systems, the action of IT remediation of security issues is either done by the security team (such as awareness and training), by creating a ticket in the IT service system (call for patch managements), and/or by tools that are triggered by security and monitored by IT (automatic deployment of security policies, change of authentication and authorization, self-service access control management, etc.). Some operations can be conducted in a disconnected mode, such as upgrading firmware on an IoT device, in which the operator needs to access the device directly. Either automated or manual, by IT or by security, or by internal or external teams, the entire changes are constantly assessed by the first phase of discovery phase, and re-projected as a metric in a context. Progress tracking of these changes should also occur in a gradual manner, indicating maintenance scheduling on similar operational processes, hence, driving recommendations for frequent actions that can be automated, and serve as candidates to self-managed by the operations owners and systems users.

In the agile security platform of the present disclosure, acting is more than automating complex event processing (CEP) rules on alerts captured in the system logs and similar tools. Acting is started in areas highlighted according to known patterns and changing risks. Pattern detection and classification of events for approved automation processes (allocated transactions budget), are aimed at commoditization of security hardening actions in order to reduce the attention needed for prioritization. As such, a compound backlog and decision phase, can focus further on things that cannot be automated versus those that can. All issues not attended yet are highlighted, those that are handled by automation are indicated as such, and monitored to completion, with a potential additional value of increasing prioritization due to changing risks impact analysis.

Figure 2:
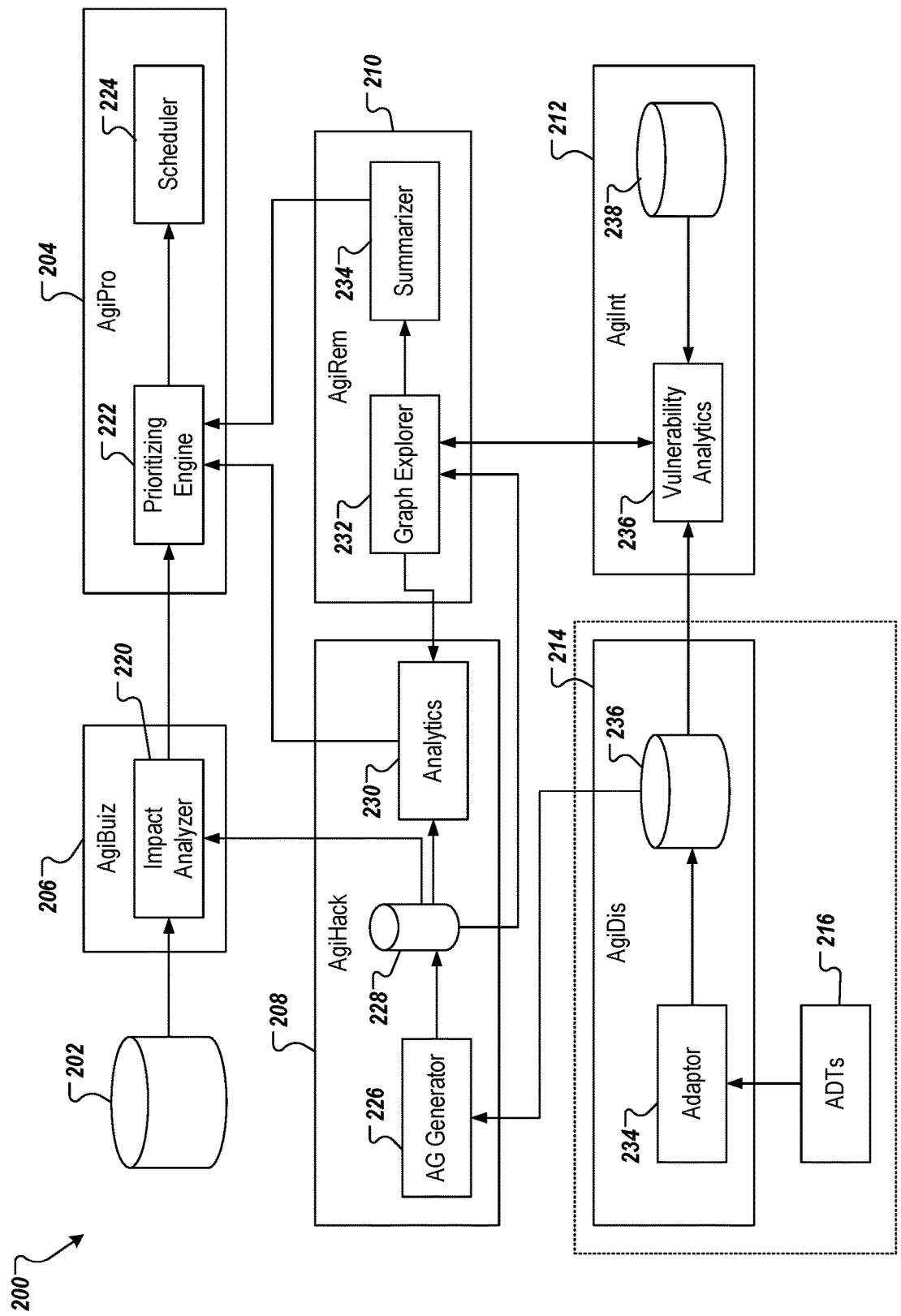
FIG. 2 depicts an example conceptual architecture of an agile security platform of the present disclosure.

FIG. 2 depicts an example conceptual architecture 200 of an agile security (AgiSec) platform in accordance with implementations of the present disclosure. The conceptual architecture 200 depicts a set of security services of the AgiSec platform, which include: an agile security prioritization (AgiPro) service 204, an agile security business impact (AgiBuiz) service 206, an agile security remediation (AgiRem) service 210, an agile security hacker lateral movement (AgiHack) service 208, an agile security intelligence (AgiInt) service 212, and an agile security discovery (AgiDis) service 214. The conceptual architecture 200 also includes an operations knowledge base 202 that stores historical data provided for an enterprise network (e.g., the enterprise network 120).

In the example of FIG. 2, the AgiDis service 214 includes an adaptor 234, and an asset/vulnerabilities knowledge base 236. In some examples, the adaptor 234 is specific to an asset discovery tool (ADT) 216. Although a single ADT 216 is depicted, multiple ADTs can be provided, each ADT being specific to an IT/OT site within the enterprise network. Because each adaptor 234 is specific to an ADT 216, multiple adaptors 234 are provided in the case of multiple ADTs 216.

In some implementations, the AgiDis service 214 detects IT/OT assets through the adaptor 234 and respective ADT 216. The discovered assets can be used to generate an asset inventory, and network maps. In general, the AgiDis service 214 can be used to discover vulnerabilities in the enterprise network, and a holistic view of network and traffic patterns. In some implementations, this is achieved through passive network scanning and device fingerprinting through the adaptor 234 and ADT 216. The AgiDis service 214 provides information about device models. In some implementations, the automated asset discovery process uses active probing in the IT domain, and active and passive scanning in the OT domain.

Once all assets (also referred to herein as configuration items (CIs)) are discovered, threat intelligence knowledgebases (e.g., iDefence, NVD, CVE) are used to extract cataloged vulnerabilities and security issues associated with discovered CIs, as described in further detail herein. In the example of FIG. 2, the AgiInt service 212 includes a vulnerability analytics module 236 and a threat intelligence knowledge base 238 (e.g., CVE, CAPEC, CWE, Maglan Plexus, iDefence API, vendor-specific databases). In some examples, the AgiInt service 212 discovers vulnerabilities in the enterprise network based on data provided from the AgiDis service 214. In some examples, the vulnerability analytics module 236 processes data provided from the AgiDis service 214 to provide information regarding possible impacts of each vulnerability and remediation options (e.g., permanent fix, temporary patch, workaround) for defensive actions. In some examples, the vulnerability analytics module 236 can include an application programming interface (API) that pulls out discovered vulnerabilities and identifies recommended remediations using threat intelligence feeds. In short, the AgiInt service 212 maps vulnerabilities and threats to discovered IT/OT assets.

In the example of FIG. 2, the AgiHack service 208 includes an attack graph (AG) generator 226, an AG database 228, and an analytics module 230. In general, the AgiHack service 208 constructs AGs and evaluates hacking exploitation complexity. In some examples, the AgiHack service 208 understand attack options, leveraging the vulnerabilities to determine how a hacker would move inside the network and identify targets for potential exploitation. The AgiHack service 208 proactively explores adversarial options and creates AGs representing possible attack paths from the adversary's perspective. The AgiHack service 208 provides both active and passive vulnerability scanning capabilities to comply with constraints, and identifies device and service vulnerabilities, configuration problems, and aggregate risks through automatic assessment.

In further detail, the AgiHack service 208 provides rule-based processing of data provided from the AgiDis service 214 to explore all attack paths an adversary can take from any asset to move laterally towards any target (e.g., running critical operations). In some examples, multiple AGs are provided, each AG corresponding to a respective target within the enterprise network. Further, the AgiHack service 208 identifies possible impacts on the targets. In some examples, the AG generator 226 uses data from the asset/vulnerabilities knowledge base 236 of the AgiDis service 214, and generates an AG. In some examples, the AG graphically depicts, for a respective target, all possible impacts that may be caused by a vulnerability or network/system configuration, as well as all attack paths from any-where in the network to the respective target. In some examples, the analytics module 230 processes an AG to identify and extract information regarding critical nodes, paths for every source-destination pair (e.g., shortest, hardest, stealthiest), most critical paths, and critical vulnerabilities, among other features of the AG. If remediations are applied within the enterprise network, the AgiHack service 208 updates the AG.

In the example of FIG. 2, the AgiRem service 210 includes a graph explorer 232 and a summarizer 234. In general, the AgiRem service 210 provides remediation options to avoid predicted impacts. For example, the AgiRem service 210 provides options to reduce lateral movement of hackers within the network and to reduce the attack surface. The AgiRem service 210 predicts the impact of asset vulnerabilities on the critical processes and adversary capabilities along kill chain/attack paths and identifies the likelihood of attack paths to access critical assets and prioritizes the assets (e.g., based on shortest, easiest, stealthiest). The AgiRem service 210 identifies remediation actions by exploring attack graph and paths.

In further detail, for a given AG (e.g., representing all vulnerabilities, network/system configurations, and possible impacts on a respective target) generated by the AgiHack service 208, the AgiRem service 210 provides a list of efficient and effective remediation recommendations using data from the vulnerability analytics module 236 of the AgiInt service 212. In some examples, the graph explorer 232 analyzes each feature (e.g., nodes, edges between nodes, properties) to identify any condition (e.g., network/system configuration and vulnerabilities) that can lead to cyber impacts. Such conditions can be referred to as issues. For each issue, the AgiRem service 210 retrieves remediation recommendations and courses of action (CoA) from the AgiInt service 212, and/or a security knowledge base (not shown). In some examples, the graph explorer 232 provides feedback to the analytics module 230 for re-calculating critical nodes/assets/paths based on remediation options. In some examples, the summarizer engine 234 is provided as a natural language processing (NLP) tool that extracts concise and salient text from large/unstructured threat intelligence feeds. In this manner, the AgiSec platform can convey information to enable users (e.g., security teams) to understand immediate remediation actions corresponding to each issue.

In the example of FIG. 2, the AgiBuiz service 206 includes an impact analyzer 220. In general, the AgiBuiz service 206 associates services that are provided by the enterprise with IT/OT assets, generates a security map, identifies and highlights risks and possible impacts on enterprise operations and industrial processes, and conducts what-if prediction analyses of potential security actions remediations on service health levels. In other words, the AgiBuiz service 206 identifies risk for each impact predicted by the AgiHack service 208. In some examples, the impact analyzer 220 interprets cyber risks and possible impacts (e.g., financial risk) based on the relative importance of each critical asset and its relative value within the entirety of the enterprise operations. The impact analyzer 220 processes one or more models to compare the financial risks caused by cyber attacks with those caused by system unavailability due to shutdown time for replacing/patching critical assets.

In the example of FIG. 2, the AgiPro service 204 includes a prioritizing engine 222 and a scheduler 224. In some implementations, the AgiPro service 204 prioritizes the remediation recommendations based on their impact on the AG size reduction and risk reduction on the value. In some examples, the AgiPro service 204 determines where the enterprise should preform security enforcement first, in order to overall reduce the risks discovered above, and evaluate and probability to perform harm based on the above lateral movements by moving from one CI to another. In some examples, the AgiPro service 204 prioritizes remediation actions based on financial risks or other implications, provides risk reduction recommendations based on prioritized remediations, and identifies and tracks applied remediations for risks based on recommendations.

In some examples, the prioritizing engine 222 uses the calculated risks (e.g., risks to regular functionality and unavailability of operational processes) and the path analysis information from the analytics module 230 to prioritize remediation actions that reduce the risk, while minimizing efforts and financial costs. In some examples, the scheduler 224 incorporates the prioritized CoAs with operational maintenance schedules to find the optimal time for applying each CoA that minimizes its interference with regular operational tasks.

In some implementations, the AgiSec platform of the present disclosure provides tools that enable user interaction with multi-dimensional (e.g., 2D, 3D) visualizations of computational graph data and its derived computed attributes. In some examples, topological heat maps can be provided and represent ranks and values of the derived attributes in order to expedite search capabilities over big data. In some examples, the tools also enable searching for key attributes of critical nodes, nodes representing CIs. In some implementations, these visualizations are provided within a computer or immersive environment, such as augmented reality (AR), mixed reality (MR), or virtual reality (VR). The visualizations of the present disclosure improve the ability of an automated (employing contour lines) or human interactive (based on segmented regional selection) to employ search and filtering capabilities on big data graph topology aimed at quickly identifying critical nodes in the graph which its derived (computed) attributes serve as the search criteria. The attributes to be highlighted differ and are configurable, as such, different contour lines appear based on different criteria. In some examples, the perceived importance of an attribute relative to other attributes can be controlled in view of a scenario, vertical importance, or any domain-specific consideration, through weighed attributes. Further, similar contour lines can be identified in other nearby nodes on the graph. For an immersive visualization experience, matching leading contour lines can show hidden paths, or pattern of similar geometric shape and form, hence drive improved comprehension for humans.

In the context of cyber security, a critical node, also referred to herein as cardinal node, can represent a CI that is a key junction for lateral movements within a segmented network. Namely, once acquired as a target, the cardinal node can trigger multiple new attack vectors. Cardinal nodes can also be referred to as "cardinal faucet nodes." Another node will be one that many hackers' lateral movements can reach, yet it cannot lead to an additional node. Such nodes can be referred to as "cardinal sink nodes." In the network graph, the more edges from a cardinal faucet node to other nodes, the higher the faucet attribute is. The more incoming edges to a cardinal node, the higher the sink attribute is. If a node has both sink and faucet values in correlation, the more overall cardinal this node becomes to the entire examined graph topology and is defined as a critical target to be acquired since it provides control over multiple nodes in the graphs. In certain situations, the search for a faucet attribute is more important than a sink attribute. Such as a case of finding what node to block first to prevent a segregation of an attack outbreak. In case of finding what is very hard to protect, the more sink attributes matter more.

Figure 3:
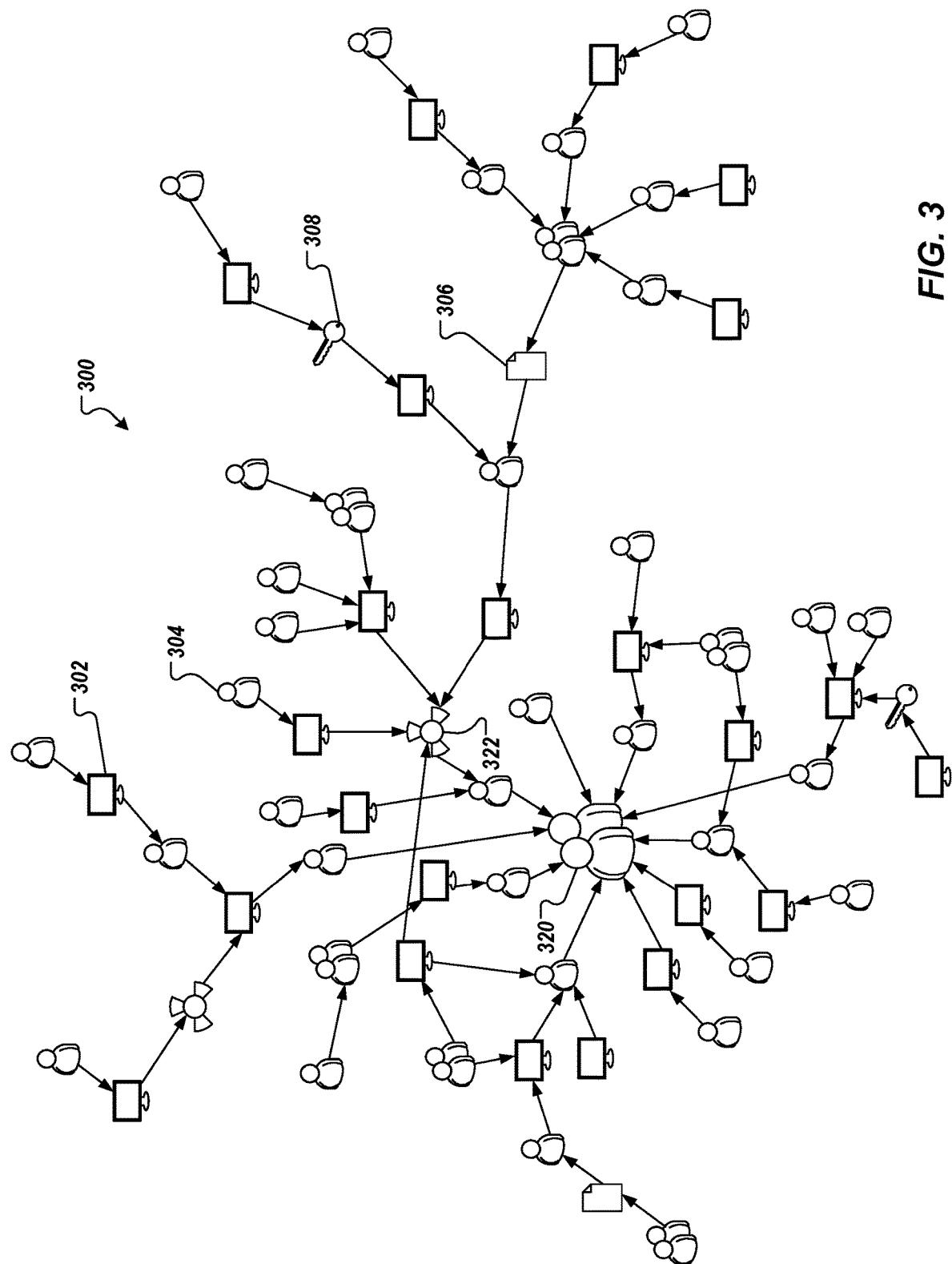
FIG. 3 depicts an example attack graph in accordance with implementations of the present disclosure.

FIG. 3 depicts an example portion 300 of an AG in accordance with implementations of the present disclosure. In some implementations, an AG is provided based on the network topology of the enterprise network. For example, the AgiHack service 208 of FIG. 2 can generate one or more AGs based on information provided from the AgiDis service 214. In some examples, an AG includes nodes and edges (also referred to as arches) between nodes. In some examples, a node can be associated with a semantic type. In the example domain of cyber-security and network topology, example semantic types can include, without limitation, computer 302, user 304, file 306, and key 308.

In some examples, an edge can include an incoming (sink) edge (e.g., an edge leading into a node from another node) or an outgoing (faucet) edge (e.g., an edge leading from a node to another node). In some examples, each edge can be associated with a respective activity. In the example domain of cyber-security and network topology, example activities can include, without limitation, logon (credentials), operating system access, and memory access. In some examples, each edge can be associated with a respective weight. In some examples, the weight of an edge can be determined based on one or more features of the edge. Example features can include a traffic bandwidth of the edge (e.g., how much network traffic can travel along the edge), a speed of the edge (e.g., how quickly traffic can travel from one node to another node along the edge), a difficulty to use the edge (e.g., network configuration required to use the edge), and a cost to use the edge (e.g., in terms of technical resources, or financial cost). In some examples, and as described in further detail below, the weights of the edges are determined relative to each other (e.g., are normalized to 1).

In some implementations, each node can be associated with a set of attributes. Example attributes can include, without limitation, the semantic type of the node, a number of incoming edges, a number of outgoing edges, a type of each of the edges, a weight of each of the edges, and the like. In some implementations, one or more values for a node can be determined based on the set of attributes of the node, as described in further detail herein.

The example portion 300 of the AG includes tens of nodes (approximately 70 nodes in the example of FIG. 3). It is contemplated, however, that an AG can include hundreds, or thousands of nodes. In some examples, the example portion 300 of the AG is a visualization of part of the AG based on one or more filter parameters. In some examples, a user can define filter parameters that can be used to identify cardinal nodes within an AG, and segments of the AG that may be relevant to a cardinal node. In the example of FIG. 3, a node 320 can be determined to be a cardinal node based on one or more filter parameters (e.g., no outgoing edges, and more than three incoming edges). In some examples, other depicted nodes include nodes along lateral paths that lead to a cardinal node.

In the example of FIG. 3, the node 320 can represent administrator credentials, a relatively high-value target within an enterprise network, and all other edges and nodes define the paths within the AG that lead to the node 320. While the AG can include hundreds, or thousands of nodes and edges, the example portion 300 is provided based on identification of the node 320 as the cardinal node (e.g., based on filter parameters) and all paths of the AG that lead to the node 320. In this manner, the portion 320 provides a more easily consumable visualization than depicting an entirety of the AG.

In some implementations, other nodes besides the cardinal node can be identified as relatively important nodes (e.g., relative to other depicted nodes). In some examples, the relative importance of a node can be determined based on attack paths that lead to a cardinal node. In the example of FIG. 3, a node 322 can be determined to be a relatively important node. Starting from the node 322, there is a single attack path to the node 320. However, there are approximately ten different attack paths that the node 322 is included in. Consequently, security resources could be concentrated on the node 322, as opposed to nodes upstream of the node 322 in the multiple attack paths. In this manner, security resources can more efficiently protect the node 320, as described in further detail herein.

Further, AGs can change over time. That is, there is a multi-dimensional aspect to AGs with one dimension including time. For example, and with continued reference to the example of FIG. 3, the node 320 can be considered a cardinal node based on the filter parameters. At another time, the node 320 might no longer be considered a cardinal node. For example, between the first time and the second time, values of attributes may have changed for nodes, some nodes may have been removed from the network (e.g., computers retired, users removed), and/or some nodes may have been added to the network (e.g., new computers/users).

As introduced above, implementations of the present disclosure provide for prioritization of actions for remediation of cyber attacks based on lateral movements of a malicious user within a network. More particularly, and as described in further detail herein, implementations of the present disclosure consider the ability of malicious users to access supporting CIs from the network through lateral movements and estimate which attack path should be handled first in order to prevent a comprised CI. In some implementations, a relative importance and complexity of an attack path are determined and cyber actions to block accessing a CI are prioritized. In this manner, cyber actions are efficiently implemented to prevent damage and reduce the attack surface and internals of the network, gradually increasing the entire network cyber resilience.

Figure 4:
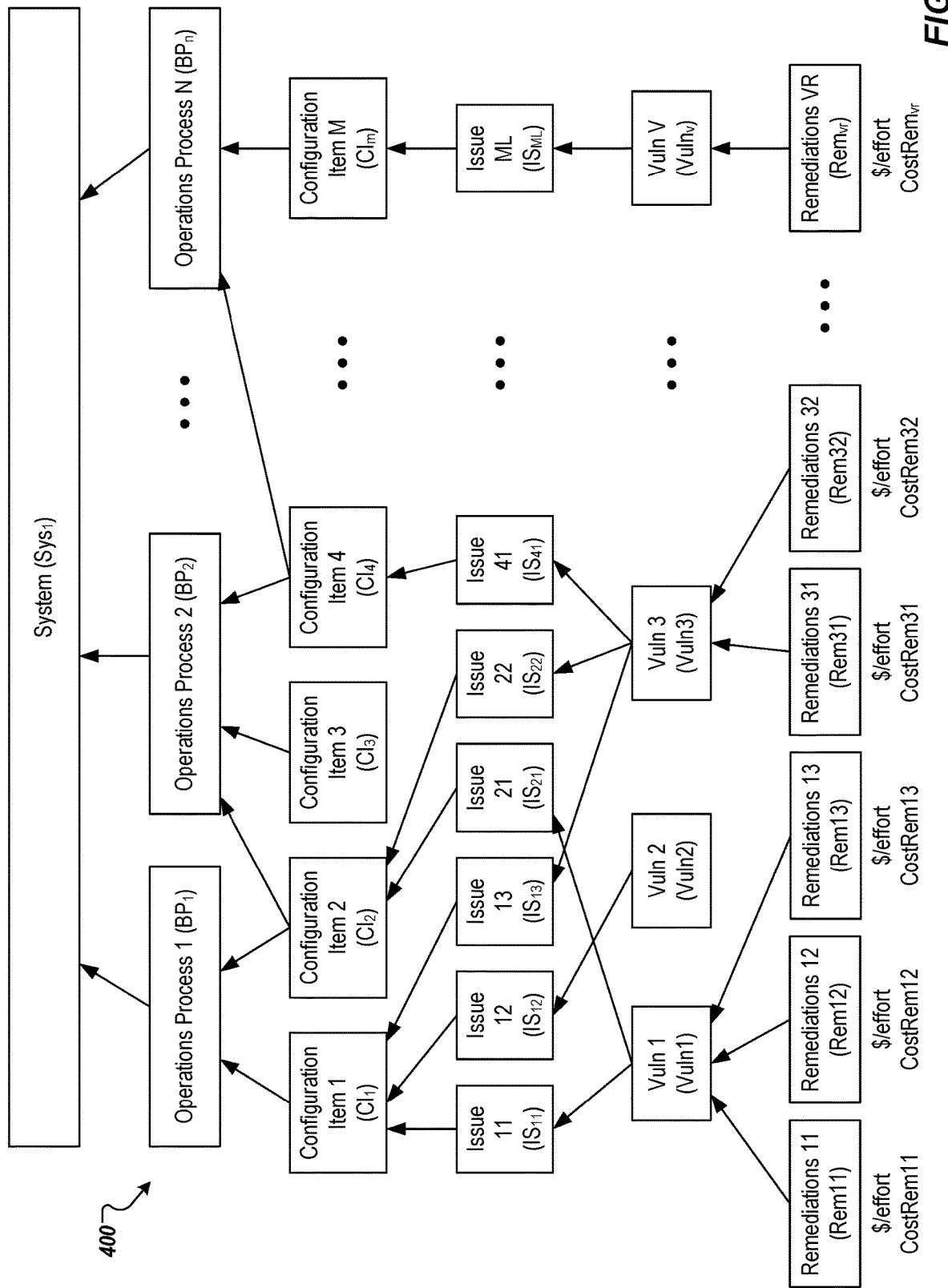
FIG. 4 depicts a conceptual diagram for cyber-attack risk calculation in accordance with implementations of the present disclosure.

FIG. 4 depicts a conceptual diagram 400 for cyber-attack risk calculation in accordance with implementations of the present disclosure. In some implementations, a system that provides value and is controlled by an enterprise is denoted as Sys, and a process is denoted as BP. In some examples, one or more processes can support a single system. In some examples, N is the total number of BPs that can support a system. A system includes at least one BP, namely:

$$N=\{1,2,\ldots n\}\in \mathbb{N}_1 \qquad (1)$$

As described above, a configuration item (CI) is a physical IT/OT element, or a logical IT/OT element, that is part of one or more BPs. In the area of cyber security, a target CI to be compromised can be referred to as a crown jewel. An example crown jewel that is a logical CI is the network administration credentials. An example crown jewel that is a physical CI can be a web server. An example for a pure logical BP can be referred to as a cyber administrator that has only one supporting logical CI, which is the administration credentials. An example of a pure physical BP can include boiler activation that has only one supporting physical CI, which is a supervisory control and data acquisition (SCADA) controller, a programmable logic controller (PLC), or a human-machine interface (HMI) access.

In some examples, there are a set of M CIs in a Sys, namely:

$$M=\{1,2,\ldots m\}\in \mathbb{N}_1 \quad (2)$$

A subset of CIs that is part of the entire set of CIs of the system and supports a single process n ($BP_n$), is denoted as $K_n$ namely:

$$K_n \subseteq M \quad (3)$$

The relative normalized contribution of a supporting entity $CI_k$ on a compound outcome is denoted as $CI_{Weight_{k,n}}$ and defined as the proportional contribution in percentage of a $CI_k$ to a successful outcome of the process $BP_n$. In services, a supporting $CI_k$ can also be single point of failure to the entire $BP_n$, hence, the normalized weighted contribution of each $CI_{Weight_{k,n}}$ can be maximized accordingly to:

$$CI_{Weight_{k,n}} \leq 100\%, k \in K_n \quad (4)$$

In cases where compromising or degradation of performance of any of the supporting $CI_k$ does not bring the entire $BP_n$ to a halt, the overall weights should be normalized. For example:

$$\Sigma_{i=1}^{k} CI_{Weight_{k,n}}=100\%, k \in K_n \quad (5)$$

Default allocation of supporting weights of $CI_k$ to a $BP_n$ in cases where no prior knowledge of relative contribution is known can be uniformly provided either as:

$$CI_{Weight_{i,n}} = \frac{1}{k} \quad (6)$$

to indicated relative contribution, or as:

$$CI_{Weight_{i,n}}=100\% \quad (7)$$

to indicate that each CI is a single point of failure, or any combination of both of the above relationships.

FIG. 4 depicts the entity relations in constructing accumulated risk estimation and resulting impact of misfunctioning or degradation in performance of a $CI_m$ on multiple supported $BP_n$s. In some examples, the degradation of performance can be driven by several cyber issues denoted as $IS_{ML}$ that are associated with a single $CI_m$ with a relative issue number. The issues are driven by existing vulnerabilities that can be exploited and denoted as $Vuln_v$. Each documented vulnerability $Vuln_v$ can affect one or more issues $IS_{ML}$, and each issue $IS_{ML}$ affects a single associated $CI_m$.

A tangible risk to a full $BP_n$ is driven by a set of $CI_m$ that support the $BP_n$ and can be compromised, because they contain one or more cyber issues. However, not all $CI_m$ have cyber issues and hence are less likely to be compromised. In some examples, $CI_m$ that do not have issues will be considered healthy and will not be part of the risk calculation.

In a single $CI_m$ cyber issues are ranked in terms of risk severity to high, medium and low, in which high severity is defined as an easier effort to compromise a $CI_m$. As such, in cases where several issues exist in a single $CI_m$, eliminating the higher risk issues first is prioritized over attending to lower severity issues. As long as there are $IS_{ML}$ on a $CI_m$, the $CI_{Weight_{k,n}}$ value will be considered in the overall risk evaluation for a supported $BP_n$ as defined below.

In addition, if, within the set of $CI_m$ that support the $BP_n$, a certain $CI_m$ has a value of $CI_{Weight_{k,n}}=100\%$, its issues should be remediated first prior to other $CI_m$. Once such cases are eliminated, the component prioritizes the rest of the $CI_m$ to be handled according to the ones with the highest $CI_{Weight_{k,n}}$ value. As such, the initial risk to a $BP_n$ is defined as:

$$Initial\_BPRisk_n = \begin{cases} \sum_{i \in K_n} CI_{Weight_{i,n}}, & \text{for } A \\ 100\%, & \text{for } B \\ \text{where } \forall IS_{ML(i,n)} \neq \emptyset \end{cases} \quad (7)$$

A: where $\forall CI_{Weight_{i,n}} \not\exists\; CI_{Weight_{i,n}} = 100\%$

B: where $\forall CI_{Weight_{i,n}} \exists\; \text{one } CI \mid CI_{Weight_{i,n}} = 100\%$ In the notation above, A indicates a scenario, in which compromise of any particular $CI_m$ would not lead to a total failure of the $BP_n$ (e.g., the $BP_n$ is degraded, but does not fail when $CI_m$ is compromised). In the notation above, B indicates a scenario, in which compromise of a particular $CI_m$ would lead to a total failure of the $BP_n$ (e.g., the $BP_n$ fails when $CI_m$ is compromised). In such a scenario, a sum of $CI_{Weight_{k,n}}$ values can exceed 100% (e.g., compromise of $CI_1$ results in total failure of the BP, and compromise of $CI_2$ results in degradation, but not failure, of the BP).

Denoting $BPV_n$ as the total value of a $BP_n$ (e.g., in terms of economics, proportional importance to the system, technical resources of the system), the impact of a single CI indexed as i that supports $BP_n$ and has vulnerabilities and issues is defined as:

$$CImpact_{i,n}=CI_{Weight_{i,n}}*BPV_n \quad (8)$$

The overall business impact risk on the entire $BP_n$ is defined as:

$$BImpact_n=BPV_n*Initial\_BPRisk_n \quad (9)$$

Combing Equations (7) and (9) implies that, in case there is a $CI_m$ with a $CI_{Weight}=100\%$, the impact on the $BP_n$ is maximum and will be equal to $BPV_n$. Consequently, the initial risk impact of each of the supporting CI on the entire system as a whole is provided as:

$$SySImpact_{CI(m)} = \frac{\sum_{j=1}^{N} CImpact_{m,j}}{\sum_{n=1}^{N} BPV_n} \quad (10)$$

where $m \in M$.

Figure 5:
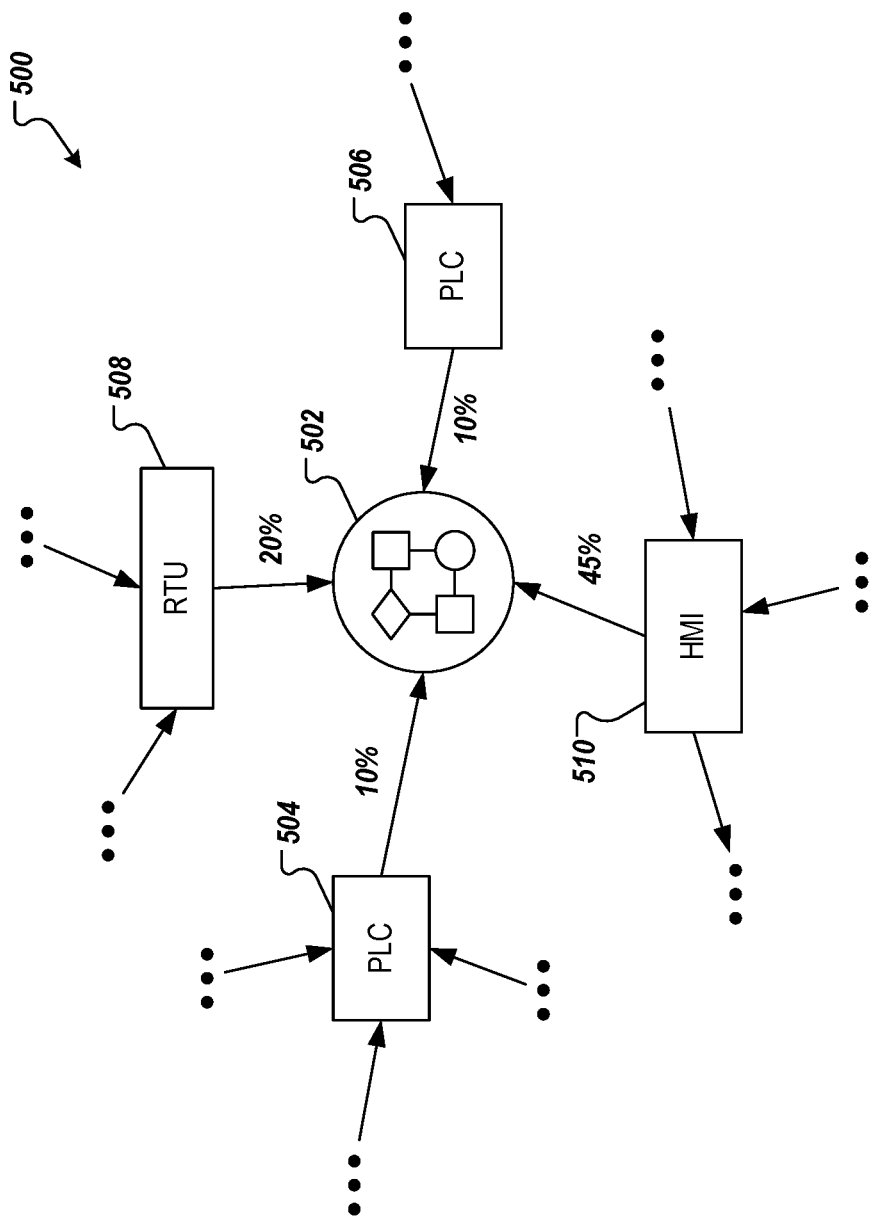
FIG. 5 depicts an example portion of an attack graph to illustrate implementations of the present disclosure.

FIG. 5 depicts an example portion 500 of an AG to illustrate implementations of the present disclosure. The example portion 500 is of an AG that is generated for a process 502. In the depicted example, the process 502 is supported by configuration items 504, 506, 508, 510 having respective proportional impacts on the process 502. The configuration items 504, 506, 508, 510 are considered exploitable, and are therefore included in the AG. Although other configuration items can support the process 500, they are non-exploitable, and are therefore not included in the AG.

As depicted in FIG. 5, the example portion 500 includes PLCs (CIs 504, 506), a remote terminal unit (RTU) (CI 508), and a HMI (CI 510) that are part of a larger set of CIs that directly control the BP 502 and their failure would result failure of the BP 502. The total contribution of supporting CIs is 100%, of which only the displayed CIs 504, 506, 508, 510 can be compromised with the total proportional impact on risk of 85%. As depicted in FIG. 5, only potentially exploitable CIs appear on the AG. There are other CIs that do not directly control the BP 502 and can be displayed on the AG due to security issues and possible attack paths from them to the CIs supporting the BP. For example, a remote user (e.g., over the Internet) may exploit a vulnerability on a corporate IT server and perform a lateral move to the HMI, which impacts the entire BP 502 by 45%.

Implementations of the present disclosure also provide prioritization of actions for remediations of cyber-attacks. As described in further detail herein, prioritization is based on an AG that includes nodes representing CIs within a network. In some examples, after the impact of each CI on the entire system is calculated, all adversarial lateral movements that can progress toward CIs that are part of a BP of the entire Sys are explored. In some examples, a logical AG that includes potential attack paths from any given asset in the network to the CIs and to all processes.

Activity of a malicious user (hacker) within the network represented by the AG can be indicated as Action. A lateral movement complexity ($LMC_{ij}$) describes a lateral movement Action between two nodes on the AG denoted as i (a source CI) and j (a destination CI). Accordingly, the following example relationship can be provided:

$$LMC_{i,j}=LMP_{CI(i) \to CI(j)} \quad (11)$$

where $i,j \in M$. A lateral movement path ($LMP_{ab}$) is defined as a set of a linked list data structure of $LMC_{i,j}$ as:

$$LMP_{a,b}=LMC_{a,j} \cup LMC_{j,b} \quad (12)$$

where j, a, b∈M, and j is index for any node in the path from source a to destination b excluding nodes a and b.

In some implementations, a complexity value ($LMCV_{ij}$) is assigned to every $LMC_{ij}$, in which a low value (e.g., 1) represents an easiest Action complexity to perform and a high value (e.g., 9) is the most difficult Action to perform for a single $LMC_{i,j}$ arch (edge) in an AG. For example:

$$LMCV_{i,j} \in \{1,2, \ldots 9\} \in \mathbb{N}_1 \quad (13)$$

In some examples, the complexity value ($LMCV_{ij}$) is provided from a threat intelligence service. For example, the threat intelligence service can provide scores (complexity value) for types of lateral movements.

In some implementations, a preconditioned action (ActionCV) is performed prior to a specific Action. In some examples, ActionCV is not sequential in nature and can be repetitive and iterative on the same node and CI, hence not necessarily on a path p. In some implementations, a complexity value ($LMPV_{a,b,p}$) of a path p of a lateral movement $LMP_{a,b}$ (which can include multiple sets of $LMP_{a,b}$) is provided as:

$$LMPV_{a,b,p}=\Sigma_{i=a}^{b-1} LMCV_{i,i+1}+\Sigma_{j=1}^{q} ActionCV_{i,i+1} \quad (14)$$

where $\forall LMCV_{i,i+1}=[1 \ldots 9]$, q=|ActionCV| and p∈{pab1, pab2, pab3 ... $pab_t$}∈P. Here, P is the set of all possible paths ($pab_t$) and a path (p) is provided between nodes a and b that are sequentially ordered and linked.

In some examples, b nodes are defined as part of $K_b$ crown jewels (targets), which are the set of supporting $CI_k$s for the process $BP_n$ that can be compromised and have issues $IS_{ML}$. A set of entry nodes Y is provided and includes nodes a that can reach a target node b (crown jewel). Such a crown jewel (e.g., administrator credentials) can be referred to as a target and denoted as $CI_k$. In accordance with implementations of the present disclosure, $LMPV_{a,b,p}$ is determined for all nodes b based on the following example algorithm:

| Algorithm 1 |
|---|
| [1] ∀b ∈ $K_n$ ∈ M |
| [2]  ∀a ∈ Y ∈ M |
| [3]   Compute $LMPV_{a,b,p}$ |
| [4]  Next a |
| [5] Next b |

Figure 6:
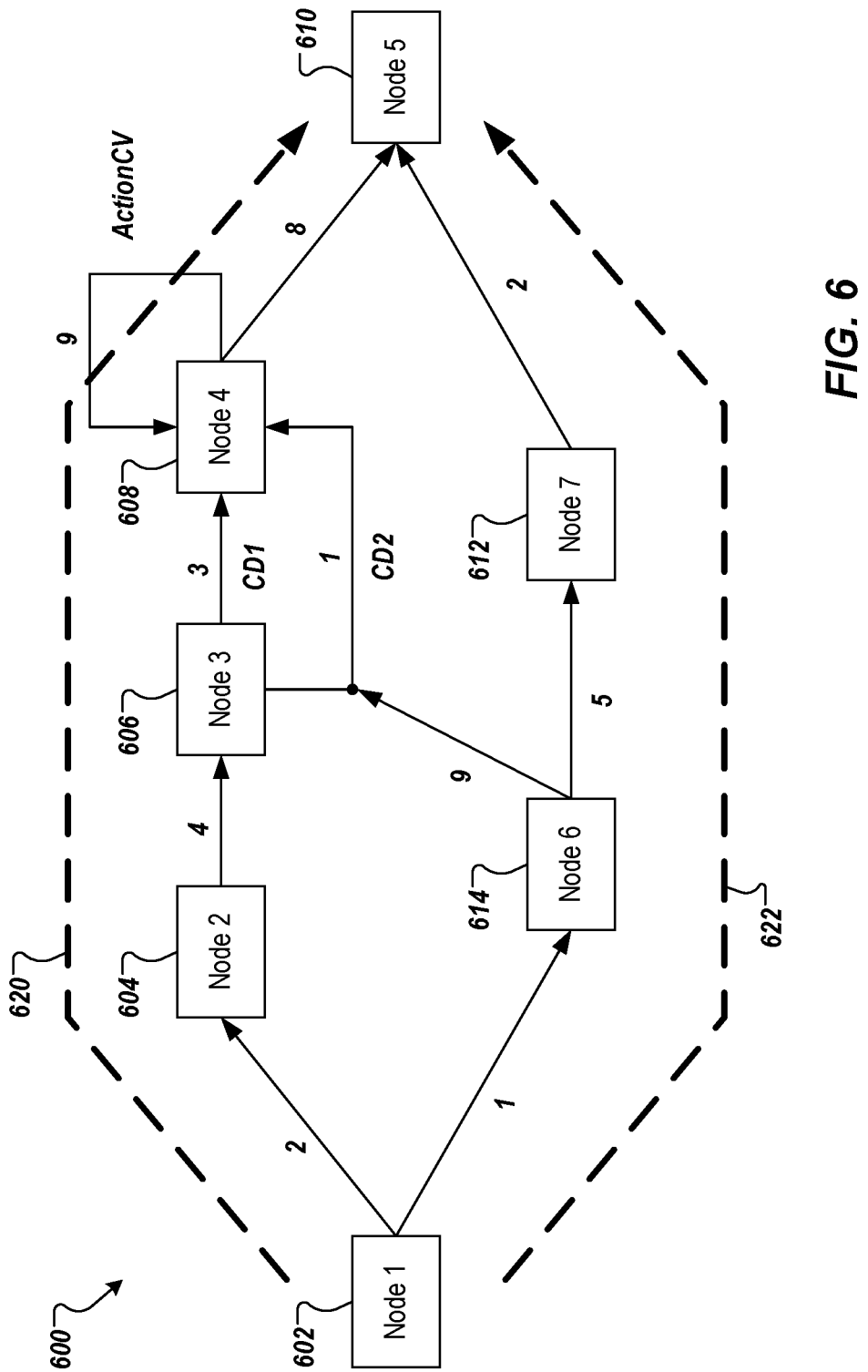
FIG. 6 depicts an example of determining complexity of attack paths in accordance with implementations of the present disclosure.

FIG. 6 depicts an example of determining complexity of attack paths in accordance with implementations of the present disclosure. The example of FIG. 6 includes an example portion 600 of an AG that includes nodes 602, 604, 606, 608, 610, 612, 614 representing CIs within a network. In the example of FIG. 6, a first path 620 from the node 602 to the node 610, and a second path 622 from the node 602 to the node 610. The complexity for each path 620, 622 is calculated based on Algorithm 1, above. As depicted in FIG. 6, the path 620 includes an ActionCV, while the path 622 does not. As such, the complexity value $LMPV_{a,b,p}$ of the path 622 is 8 (e.g., ai+ij+jb, with values of 1, 5, and 2, respectively) and the complexity value $LMPV_{a,b,p}$ of the path 620 is 26 (with values of 2, 4, 3, 9, 8, respectively). In the example of FIG. 6, the node 614 can be considered divergent, because multiple paths (path segments) stem from the node 614. Accordingly, the node 614, as divergent, provides a pivot point for an attacker, which can attack along optional paths. In the example of FIG. 6, the node 608 can be considered convergent, because multiple paths (path segment) lead to the node 608. Accordingly, the node 608 may be easier to attack (e.g., laterally move to), because there are more paths that lead to the node 608.

In accordance with implementations of the present disclosure, probable attack paths that an attacker may take towards a given target can be determined based on complexity values of the respective attack paths (e.g., as depicted by way of example in FIG. 6). Remediation requirements can be determined, which can be implemented to avoid an attack along the identified attack paths. In some examples, a remediation requirement describes what vulnerability is to be fixed such that a potential hacker will not be able to perform a lateral movement between two sequential CIs on an attack path, thereby terminating the ability to acquire a target on the path. As the resources for implementing security requirements are limited, implementations of the present disclosure prioritize remediation requirements based on their effectiveness in reducing risk with minimum resources and minimal efforts. Such remediation requirements are more complex in industrial environments due to operational constraints (e.g., a PLC's firmware cannot be patched, because it may interrupt a critical; an HMI's operating system cannot be upgraded, because it may interfere with real-time network traffic in the OT environment and cause a delay in a service). Consequently, and as described in further detail herein, multiple criteria are considered in prioritizing remediation requirements. Example criteria include, without limitation, remediation flexibility, likelihood and complexity of the attack due to the level of needed threat actors, and overall impact.

In some implementations, an initial risk (Initial_$BPRisk_n$) can be provided as the percentage of risk to a $BP_n$ due to a set of compromised crown jewels ($CI_k$), namely, all of the nodes b that can be compromised according to an AG and that belong to the $BP_n$. In some examples, Initial_$BPRisk_n$ is the percentage of risk manifestation associated with a certain $BP_n$, which is further allocated proportionally to its supporting $CI_k$. Namely, all nodes b that can be comprised according to an AG and that belong to a single $BP_n$. As long as a $CI_k$ target can be reached through lateral movements, the proportional contribution of that target to the overall Initial_BPRisk$_n$ remains relevant. That is, if a $CI_k$ can be compromised, the risk contribution to the overall Initial_BPRisk$_n$ remains the same. In some implementations, a proposed remediation (REM$_{VR(i)}$) is provided out of a set of g remediation requirements that are possible for each issue $IS_{ML}$ caused by a vulnerability Vuln$_{vs}$, such that:

$$\forall IS_{ML(l)} \exists REM_{VR(i)}, i \in \{1, \ldots g\} \quad (15)$$

In some implementations, a cost function (CostRem$_{vr}$) is associated with each REM$_{VR(i)}$ that can resolve a single $IS_{ML}$, such that:

$$\forall REM_{VR(i)} \exists CostRem_{VR(i)}, i \in \{1, \ldots g\} \quad (16)$$

In accordance with implementations of the present disclosure, all of the issues that needed to be remediated for a $BP_n$ to reduce the risk thereto are prioritized based on the following 1) prioritized target's importance; 2) easiest attack path or easiest attack segment; and 3) relative risk remediation contribution of the same CI to other processes. Algorithm 2, below, provides the remediation process:

---
Algorithm 2
---
[1] $\forall b \in K_n \in M$, where $K_n$ is ordered from highest $CI_{Weight(b,n)}$ value supporting $BP_n$
[2] $\forall p \in P_b$, where P paths to b, are ordered by lowest LMPV$_{a,b,p}$ values
[3]   $\forall node_m \in p$, where the nodes on p are ordered by lowest LMCV$_{i,j}$ values or lowest CostRem$_{vr}$
[4]   Print (display/ present) $IS_{ML}$ and its set of REM$_{VR}$ and CI$_{Weight(b,n)}$
[5]     If $node_m \in BP_w$, where $w \neq n$, present impact on Sys
[6]       Present REM$_{VR}$ and CI$_{Weight(b,n)}$
[7]       (option) Compute SySImpact$_{CI(m)}$
[8]     End if
[9]   Next node
[10] next p
[11] next b

---

In Algorithm 2, for a given BP, every supporting CI starting with the highest impact CIs, and all of the active easiest attack paths to those CIs are examined. As such, the overall attack surface is hardened, by incrementally removing attack paths, if acting on the prioritized requirements. Once all attack paths to a target node b are removed, the proportional risk contribution of that node can be subtracted from the overall risk likelihood, reducing the overall likelihood of risk manifestation.

In some implementations, a convergent value can be determined for each node j in an attack path p for a $BP_n$ (where $n \in N$), and SySImpact$_{CI(m)}$ is determined for each node ($CI_m$) on the attack path (where $m \in K$). In some examples, a Covergent_Val for a node j is provided as the count of all LMCV$_{i,j}$ that enters j, where i can be any dispatching node in K. For example:

$$Convergent\_Val_j = |LMC_{i,j}| \quad (17)$$

where $i \in K$ and $\forall LMCV_{j,i} > 1$. In some implementations, a divergent value can be determined for each node i in the attack path p. In some examples, Divergent_Val for a node i is provided as the count of all LMC$_{i,j}$ arches that exit the node i, where j can be any destination node in K. For example:

$$Divergent\_Val_j = |LMC_{i,j}| \quad (18)$$

where $j \in K$ and $\forall LMCV_{j,i} > 1$.

In some implementations, all Convergent_Val$_k$ and Divergent_Val$_k$ for each node (CI$_k$) in K are determined. In some examples, a node CI$_k$ having a maximum Divergnet_Val$_k$ is designated as the most divergent factor in the system. For example:

$$MaxDivergent = max(Divergent\_Val_k) \quad (19)$$

where $s \forall k \in K$. In some examples, a node CI$_k$ having a maximum Convergent_Val$_k$ is designated as the most convergent factor in the system. For example:

$$MaxCovergnet = max(Covergent_{Val_k}) \quad (20)$$

where $\forall k \in K$. In some implementations, a transformative vector is provided as a combination of convergent and divergent values for each CI$_k$ based on the following example relationship:

$$Transformative_k = Divergent_{Val_k} + Covergent\_Val_k \quad (21)$$

where $\forall k \in K$. In some implementations, a list of CI$_k$s in Sys are sorted to either convergent, transformative, or divergent nodes and their respective values on SySImpact$_{CI(m)}$ are provided.

In some implementations, an ordered list of remediations is provided. For example, and as described herein, a set of $BP_n$ containing $CI_k$ that has a set of attack paths P that contain issues $IS_{ML}$ with REM$_{VR}$ and associated cost can be defined. A risk reduction can be defined as employing a remediation REM$_{VR}$ to an issue $IS_{ML}$, which will disable the ability to transverse on a path p (i.e., disconnect the path). A gradual risk reduction can be provided as employing ordered remediation according to multiple modes. Example modes include a divergent mode, a convergent mode, a less costly mode, and a most probable mode. In some examples, in the divergent mode, for a node i, remediations are performed on the node i+1 that is connected to the exit arches. In some examples, in the convergent mode, the remediations are performed on the node i that has incoming multiple arches. In some examples, in the less costly mode, for the path p with the lowest LMPV$_{a,b,p}$ value, remediations that have the lowest cost CostRem$_{vr}$ value are prioritized. In some examples, in the most probable mode, for the path p with the lowest LMPV$_{a,b,p}$ value, remediations that are associated with issues $IS_{ML}$ that can prevent a lateral movement LMC$_{i,j}$ and that the lowest complexity LMCV$_{i,j}$ value are prioritized.

It can be noted that, once a path has an associated remediation resolved, the path is no longer part of the set of P possible paths across all Sys. Consequently, the next lowest LMPV$_{a,b,p}$ is attended to.

As described in detail herein, a flow of interactions can be performed through the AgiSec platform of the present disclosure to provide an AG, such as the AG having the example portion 500 depicted in FIG. 5. For example, the AgiSec platform discovers and retrieves a list of IT and OT assets (CIs) and captures the network topology. The AgiSec platform indicates how the discovered CIs are mapped to processes and services. That is, which CI supports which process and what is its proportional contribution to that process is (e.g., as depicted by way of example in FIG. 5). As such, the AgiSec platform provides insights into the processes topology of an enterprise and can be used to analyze the dependency structure of IT/OT for other usages. This topological structure is constructed with AgiDis and AgiBuiz modules, as described herein.

In accordance with implementations of the present disclosure, the AgiSec platform extracts a list of specific vulnerabilities for every CI that is based on adversarial tactics (e.g., MITRE) or attack tactics unique to the enterprise created by security experts. In parallel, the AgiSec platform extracts the associated threat intelligence from cataloged repositories in order to create the intelligence contextual mapping of each of the investigated CIs, which is referred to Contextual Intelligence. The AgiSec platform further investigates the discovered CIs for additional information that can be used to compromise the CIs. Examples include, without limitation, open network sessions, in-memory credentials, open ports, administration batch files, and the like. This is accomplished by AgiDis and AgiInt modules, as described herein.

After the discovered vulnerabilities and potential exploitations are accumulated from the threat intelligence feeds, the AgiSec platform simulates all possible attack paths and attack actions as a virtual adversary. The simulated virtual adversary analytics is conducted on a dedicated server, creating a model of lateral movement topology of the examined environment, and representing a logical analysis of adversarial potential lateral movements. This comprehensive view for all potential attacks on all target CIs and hence on all processes, is used to generate the AG. This analysis is performed at the AgiHack module, as described herein.

The AgiSec platform analyzes the AG topology in detail and uses threat intelligence feeds to determine remediation requirements options. When applied, the AgiSec platform performs a what-if analysis for predicting the efficiency of security remediation requirements according to risk reduction in accordance with implementations of the present disclosure. These actions are performed by the AgiRem module, as described herein. After the AgiSec platform completes the scan, a prioritized requirements workplan is generated as described herein, and is sent to external Security Operation Center (SOC) tools to be handled. Consequently, when notified of completion, AgiPro verifies the quality of the implementation, updates the simulated virtual adversary AG, and recalculates the associated risks. As described herein, the AgiSec platform determines the recommended risk reduction and monetization or proportional evaluation, according to the following prioritization: 1) selection of the process with the highest monetized risk; 2) selection of the highest-value critical asset within the process; 3) examination of the easiest attack path to the above critical asset; and 4) recommending a fix to the easiest segment in the easiest attack path and the cost of employing such remediation.

Figure 7:
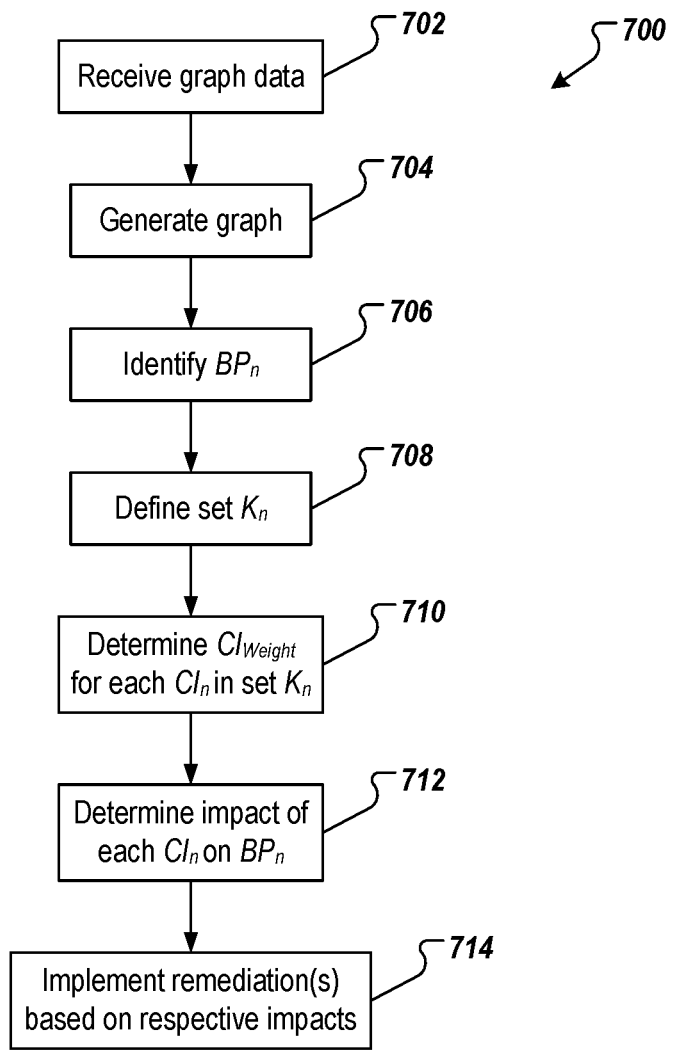
FIG. 7 depicts an example process that can be executed in accordance with implementations of the present disclosure.

FIG. 7 depicts an example process 700 that can be executed in accordance with implementations of the present disclosure. In some implementations, the example process 700 may be performed using one or more computer-executable programs executed using one or more computing devices. The example process 700 can be performed for cyber-attack risk determination in accordance with implementations of the present disclosure.

Graph data is received (702). For example, the AgiHack service 208 receives graph data from the AgiDis service 214 of FIG. 2. In some examples, and as described in detail herein, the graph data defines a graph that is representative of an enterprise network. A graph is generated (704). In some examples, and as also described in detail herein, the graph includes nodes and edges between nodes, each node representing an asset within the enterprise network, and each edge representing at least a portion of one or more lateral paths between assets in the enterprise network.

A process ($BP_n$) is identified (706). In some examples, the process is selected from a set of processes that are included in a system (Sys) (see, e.g., FIG. 4). For example, an as depicted in FIG. 5, an AG is generated and includes the process 502 and CIs 504, 506, 508, 510 that support execution of the process 502, which is included in a system. A set of CIs ($K_n$) is defined (708). For example, and as described above, $K_n$ is a subset of CIs that is part of the entire set of CIs of the system and supports the process $BP_n$.

A contribution value ($CI_{Weight_{k,n}}$) is determined for each CI in the set $K_n$ (710). For example, and as described herein, $CI_{Weight_{k,n}}$ is a normalized contribution of a supporting entity $CI_k$ on a compound outcome. In some examples, $CI_{Weight_{k,n}}$ is defined as a proportional contribution in percentage of a $CI_k$ to an outcome of the process $BP_n$. In some examples, a supporting $CI_k$ can be a single point of failure to the entire $BP_n$, hence, $CI_{Weight_{k,n}}$ can be maximized (e.g., set to 100%).

An impact of each CI on the process $BP_n$ is determined (712). For example, and as described herein, the total value of a $BP_n$ (e.g., in terms of economics, proportional importance to the system, technical resources of the system) is provided as $BPV_n$. In some examples, $BPV_n$ is defined by the enterprise operating the Sys (e.g., the enterprise determines the impact the process $BP_n$ would have on technical resources (e.g., loss of resources, expense of resources to reestablish the process $BP_n$). In some examples, the impact of a single CI indexed as i that supports $BP_n$ and has vulnerabilities and issues is defined as detailed in Equation 8, above. One or more remediations are implemented based on respective impacts (714). For example, and as described in further detail herein, one or more remediations can be selected based on respective impacts. In some examples, the remediations are prioritized to achieve efficiencies in avoiding or mitigating cyber issues (e.g., efficiencies in terms of resources, such as technical resources, expended).

Figure 8:
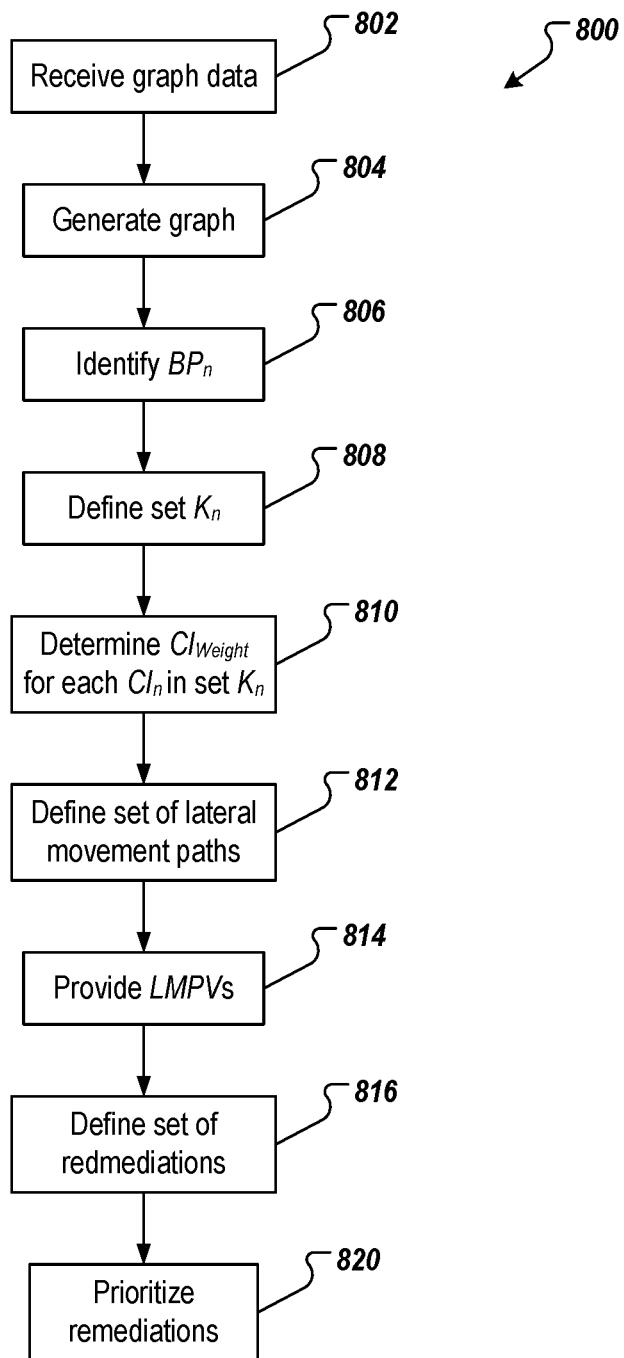
FIG. 8 depicts an example process that can be executed in accordance with implementations of the present disclosure.

FIG. 8 depicts an example process 800 that can be executed in accordance with implementations of the present disclosure. In some implementations, the example process 800 may be performed using one or more computer-executable programs executed using one or more computing devices. The example process 800 can be performed for prioritizing remediations against potential cyber-attacks based on lateral movements in accordance with implementations of the present disclosure.

Graph data is received (802). For example, the AgiHack service 208 receives graph data from the AgiDis service 214 of FIG. 2. In some examples, and as described in detail herein, the graph data defines a graph that is representative of an enterprise network. A graph is generated (804). In some examples, and as also described in detail herein, the graph includes nodes and edges between nodes, each node representing an asset within the enterprise network, and each edge representing at least a portion of one or more lateral paths between assets in the enterprise network.

A process ($BP_n$) is identified (806). In some examples, the process is selected from a set of processes that are included in a system (Sys) (see, e.g., FIG. 4). For example, and as depicted in FIG. 5, an AG is generated and includes the process 502 and CIs 504, 506, 508, 510 that support execution of the process 502, which is included in a system. A set of CIs ($K_n$) is defined (808). For example, and as described above, $K_n$ is a subset of CIs that is part of the entire set of CIs of the system and supports the process $BP_n$.

A contribution value ($CI_{Weight_{k,n}}$) is determined for each CI in the set $K_n$ (810). For example, and as described herein, $CI_{Weight_{k,n}}$ is a normalized contribution of a supporting entity $CI_k$ on a compound outcome. In some examples, $CI_{Weight_{k,n}}$ is defined as a proportional contribution in percentage of a $CI_k$ to an outcome of the process $BP_n$. In some examples, a supporting $CI_k$ can be a single point of failure to the entire $BP_n$, hence, $CI_{Weight_{k,n}}$ can be maximized (e.g., set to 100%).

A set of lateral movement paths is provided (812). For example, the set of lateral movement paths includes two or more lateral movement paths between a first asset and a second asset within the graph (e.g., the paths 620, 622 between the node 602 and the node 610 in FIG. 6). For each lateral movement path, a lateral movement path value is provided (814). As described herein, a lateral movement path value ($LMPV_{a,b,p}$) is representative of a difficulty in traversing a respective lateral movement path within the enterprise network.

A set of remediations is defined (816). For example, the set of remediations is defined based on two or more remediations defined for one or more vulnerabilities associated with issues identified for respective assets, as described herein. In some examples, each remediation mitigates a cyber-security risk within the enterprise network (e.g., as depicted in FIG. 4). Remediations are prioritized (820). For example, and as described herein, two or more remediations are prioritized based on contribution values of assets, lateral movement path values of paths, and one of lateral movement complexity values of respective segments of paths and costs of respective remediations. For example, the remediations are prioritized as described above with reference to Algorithm 2.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for implementing remediations in systems of an enterprise, the method being executed by one or more processors and comprising:
    providing, by a security platform, graph data defining a graph that is representative of a system of the enterprise, the graph comprising nodes and edges between nodes, a first set of nodes representing respective processes executed within the system of the enterprise, and a second set of nodes representing respective assets within the system, each edge representing a lateral path between assets or a contribution of an asset to a process;
    selecting, from the first set of nodes, a first node representing a particular process;
    identifying, from the second set of nodes, a subset of nodes, wherein each node of the subset represents an asset that supports execution of the particular process;
    determining, for each asset that supports execution of the particular process and based on the graph data, a contribution value indicating a respective contribution of the asset to an outcome of the particular process, wherein a contribution value of an asset is set to less than a maximum value in response to determining that compromise of the asset would degrade the particular process;
    determining, for each asset that supports execution of the particular process, an impact value based on a total value of the particular process and a respective contribution value of the asset; and
    implementing one or more remediations based on a set of impact values determined for the assets, each remediation mitigating a cyber-security risk within the system.

2. The method of claim 1, wherein a contribution value of an asset is set to a maximum value in response to determining that compromise of the asset would result in failure of the particular process.

3. The method of claim 1, wherein each remediation is implemented for a respective vulnerability and remediates an issue of a respective asset.

4. The method of claim 3, wherein the vulnerability affects multiple assets.

5. The method of claim 1, wherein the graph is generated by a discovery service of the security platform, the discovery service detecting assets using one or more adaptors and respective asset discovery tools that generate an asset inventory and a network map of the system.

6. The method of claim 1, wherein each asset is identified as a target within the system, the target being selected based on a disruption occurring to the particular process in response to an attack on the target.

7. The method of claim 6, wherein the disruption is based on one or more metrics.

8. The method of claim 7, wherein the one or more metrics comprise loss of technical resources, physical losses, disruption in services, and financial losses.

9. A non-transitory computer-readable storage medium coupled to one or more processors and having instructions stored thereon which, when executed by the one or more processors, cause the one or more processors to perform operations for implementing remediations in systems of an enterprise, the operations comprising:
    providing, by a security platform, graph data defining a graph that is representative of a system of the enterprise, the graph comprising nodes and edges between nodes, a first set of nodes representing respective processes executed within the system of the enterprise, and a second set of nodes representing respective assets within the system, each edge representing a lateral path between assets or a contribution of an asset to a process;
    selecting, from the first set of nodes, a first node representing a particular process;
    identifying, from the second set of nodes, a subset of nodes, wherein each node of the subset represents an asset that supports execution of the particular process;
    determining, for each asset that supports execution of the particular process and based on the graph data, a contribution value indicating a respective contribution of the asset to an outcome of the particular process, wherein a contribution value of an asset is set to less than a maximum value in response to determining that compromise of the asset would degrade the particular process;
    determining, for each asset that supports execution of the particular process, an impact value based on a total value of the particular process and a respective contribution value of the asset; and
    implementing one or more remediations based on a set of impact values determined for the assets, each remediation mitigating a cyber-security risk within the system.

10. The computer-readable storage medium of claim 9, wherein a contribution value of an asset is set to a maximum value in response to determining that compromise of the asset would result in failure of the particular process.

11. The computer-readable storage medium of claim 9, wherein each remediation is implemented for a respective vulnerability and remediates an issue of a respective asset.

12. The computer-readable storage medium of claim 11, wherein the vulnerability affects multiple assets.

13. The computer-readable storage medium of claim 9, wherein the graph is generated by a discovery service of the security platform, the discovery service detecting assets using one or more adaptors and respective asset discovery tools that generate an asset inventory and a network map of the system.

14. The computer-readable storage medium of claim 9, wherein each asset is identified as a target within the system, the target being selected based on a disruption occurring to the particular process in response to an attack on the target.

15. The computer-readable storage medium of claim 14, wherein the disruption is based on one or more metrics.

16. The computer-readable storage medium of claim 15, wherein the one or more metrics comprise loss of technical resources, physical losses, disruption in services, and financial losses.

17. A system, comprising:
one or more computers; and
a computer-readable storage device coupled to the one or more computers and having instructions stored thereon which, when executed by the one or more computers, cause the one or more computers to perform operations for implementing remediations in systems of an enterprise, the operations comprising:
providing, by a security platform, graph data defining a graph that is representative of a system of the enterprise, the graph comprising nodes and edges between nodes, a first set of nodes representing respective processes executed within the system of the enterprise, and a second set of nodes representing respective assets within the system, each edge representing a lateral path between assets or a contribution of an asset to a process;
selecting, from the first set of nodes, a first node representing a particular process;
identifying, from the second set of nodes, a subset of nodes, wherein each node of the subset represents an asset that supports execution of the particular process;
determining, for each asset that supports execution of the particular process and based on the graph data, a contribution value indicating a respective contribution of the asset to an outcome of the particular process, wherein a contribution value of an asset is set to less than a maximum value in response to determining that compromise of the asset would degrade the particular process;
determining, for each asset that supports execution of the particular process, an impact value based on a total value of the particular process and a respective contribution value of the asset; and
implementing one or more remediations based on a set of impact values determined for the assets, each remediation mitigating a cyber-security risk within the system.

18. The system of claim 17, wherein a contribution value of an asset is set to a maximum value in response to determining that compromise of the asset would result in failure of the particular process.

19. The system of claim 17, wherein each remediation is implemented for a respective vulnerability and remediates an issue of a respective asset.

20. The system of claim 19, wherein the vulnerability affects multiple assets.

21. The system of claim 17, wherein the graph is generated by a discovery service of the security platform, the discovery service detecting assets using one or more adaptors and respective asset discovery tools that generate an asset inventory and a network map of the system.

22. The system of claim 17, wherein each asset is identified as a target within the system, the target being selected based on a disruption occurring to the particular process in response to an attack on the target.

23. The system of claim 22, wherein the disruption is based on one or more metrics.

24. The system of claim 23, wherein the one or more metrics comprise loss of technical resources, physical losses, disruption in services, and financial losses.

* * * * *